US008427375B2

(12) United States Patent
Sato

(10) Patent No.: US 8,427,375 B2
(45) Date of Patent: Apr. 23, 2013

(54) ELECTRONIC APPARATUS

(75) Inventor: Yutaka Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 12/379,546

(22) Filed: Feb. 24, 2009

(65) Prior Publication Data

US 2009/0322626 A1 Dec. 31, 2009

(30) Foreign Application Priority Data

Jun. 27, 2008 (JP) ................................ 2008-169643

(51) Int. Cl.
*H01Q 1/24* (2006.01)
*H01Q 3/02* (2006.01)
*H04M 1/00* (2006.01)

(52) U.S. Cl.
USPC .......................... 343/702; 343/882; 455/575.7

(58) Field of Classification Search .................. 343/702, 343/882; 455/575.7
See application file for complete search history.

(56) References Cited

U.S. PATENT DOCUMENTS

| 4,123,756 | A | * | 10/1978 | Nagata et al. | .................. 343/702 |
| 5,271,684 | A | * | 12/1993 | Phillips | .......................... 403/106 |
| 6,317,085 | B1 | * | 11/2001 | Sandhu et al. | ................. 343/702 |
| 7,050,008 | B2 | | 5/2006 | Saito et al. | |
| 2002/0187805 | A1 | * | 12/2002 | Song | ............................. 455/556 |
| 2004/0207558 | A1 | | 10/2004 | Saito et al. | |
| 2007/0265028 | A1 | * | 11/2007 | Jorgensen | ................... 455/550.1 |
| 2008/0100518 | A1 | * | 5/2008 | Lev et al. | ....................... 343/702 |

FOREIGN PATENT DOCUMENTS

| JP | 43-13954 | 6/1943 |
| JP | 6-58468 | 8/1994 |
| JP | 09-246826 | 9/1997 |
| JP | 2004-64211 | 2/2004 |
| JP | 2004-228790 | 8/2004 |
| JP | 2004-328316 | 11/2004 |
| JP | 2007-035361 | 2/2007 |

OTHER PUBLICATIONS

Japanese Office Action for Application 2008-169643 issued Jun. 26, 2012.

* cited by examiner

*Primary Examiner* — Jacob Y Choi
*Assistant Examiner* — Graham Smith
(74) *Attorney, Agent, or Firm* — Staas & Halsey LLP

(57) ABSTRACT

An electronic apparatus that includes a housing for housing an electronic component and an antenna body, the housing having a base body formed of a plate section and a side surface section, and a cover for covering an edge of the base body, the plate section including an antenna housing section and a protruding section, whereas the side surface section including an opening for communicating to the outside of the housing, and the antenna body having a plate piece-like shape with a length to be housed in the antenna housing section, having an antenna for radio communications and a bearing section with an insertion hole which penetrates front and back surfaces of the antenna body to receive insertion of the protruding section, the antenna body being housed in the antenna housing section between the plate section and the cover, and protruding from the housing when being rotated.

7 Claims, 36 Drawing Sheets

ELECTRONIC APPARATUS

CROSS-REFERENCE TO RELATED APPLICATION

This application is based upon and claims the benefit of priority of the prior Japanese Patent Application No. 2008-169643, filed on Jun. 27, 2008, the entire contents of which are incorporated herein by reference.

FIELD

The embodiment discussed herein is related to an electronic apparatus having an antenna.

BACKGROUND

In recent years, an antenna has been built in not only a cellular phone but also, for example, a notebook personal computer (hereinafter abbreviated as "note PC") and the like, to make it possible to perform data communications by radio. Here, a reduction in size and weight has been strongly desired for an electronic apparatus such as the note PC, cellular phone, and the like. In response to this demand, for the electronic apparatus, a structure has been widely used in which a display housing provided with a display screen is openably and closably connected to a main housing provided with a keyboard, push buttons and the like. Such a structure allows a user to fold the electronic apparatus in a way that the main housing and the display housing overlap each other for carriage, and also to open the display housing so as to use the keyboard and the push buttons for operation. Thereby, the portability of the electronic apparatus is improved without miniaturizing the keyboard and bush buttons.

Meanwhile, there is a strong demand for an increase in size of the display device. Against such a background, a wide-type electronic apparatus has been marketed as a hot item in which a display device using a thin and light liquid crystal panel is applied, and a display screen is widened up to a portion close to a side surface of a display housing.

Incidentally, there have been increasing numbers of note PCs with a built-in antenna beside a liquid crystal panel or the like, equipped with a radio communication function. However, sensitivity is insufficient depending on a place to use, and therefore, an antenna exposed outside the housing may be needed.

However, a reduction in thickness and size of the housing of the note PC has been advancing, and thus a problem is how the antenna that is housed in the housing and exposed outside as needed is provided while maintaining the reduction in thickness and size of the housing.

Regarding a fixed antenna, a structure is known in which an antenna terminal plate and another component are co-fastened (for example, Japanese Laid-open Patent Publication Nos. 09-246826 and 2007-35361).

Moreover, regarding a magnetic recording device, a structure is known in which a screw pressing spring and a head carriage are co-fastened for the purpose of a reduction in thickness and size of the head carriage (for example, Published Utility Model Application Publication No. 06-58468).

SUMMARY

According to an aspect of the invention, an electronic apparatus includes a housing that includes: a base body that houses an electronic component, including a plate section with at least one corner and a side extending from the one corner, and a side surface section formed on a peripheral edge of the plate section in a standing manner; and a cover covering at least a peripheral edge section of the base body, wherein the plate section includes an antenna housing section that includes one corner section of the plate section and extends along one side from the one corner section, and a protruding section that is formed on the one corner section of the plate section in a standing manner towards the cover, and wherein the side surface section includes an opening which communicates between the antenna housing section and the outside of the housing; and an antenna body having a plate piece-like shape with a length to be housed in the antenna housing section, the antenna body including an antenna for radio communications and on its one end section, a bearing section with an insertion hole which penetrates front and back surfaces of the antenna body to receive insertion of the protruding section, the antenna body being housed in the antenna housing section with being sandwiched between the plate section and the cover, and protruding from the housing when being rotated with the protruding section as a rotary shaft, and wherein the cover is fastened to the protruding section with the protruding section inserted into the insertion hole.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be described below.

Figure 1:
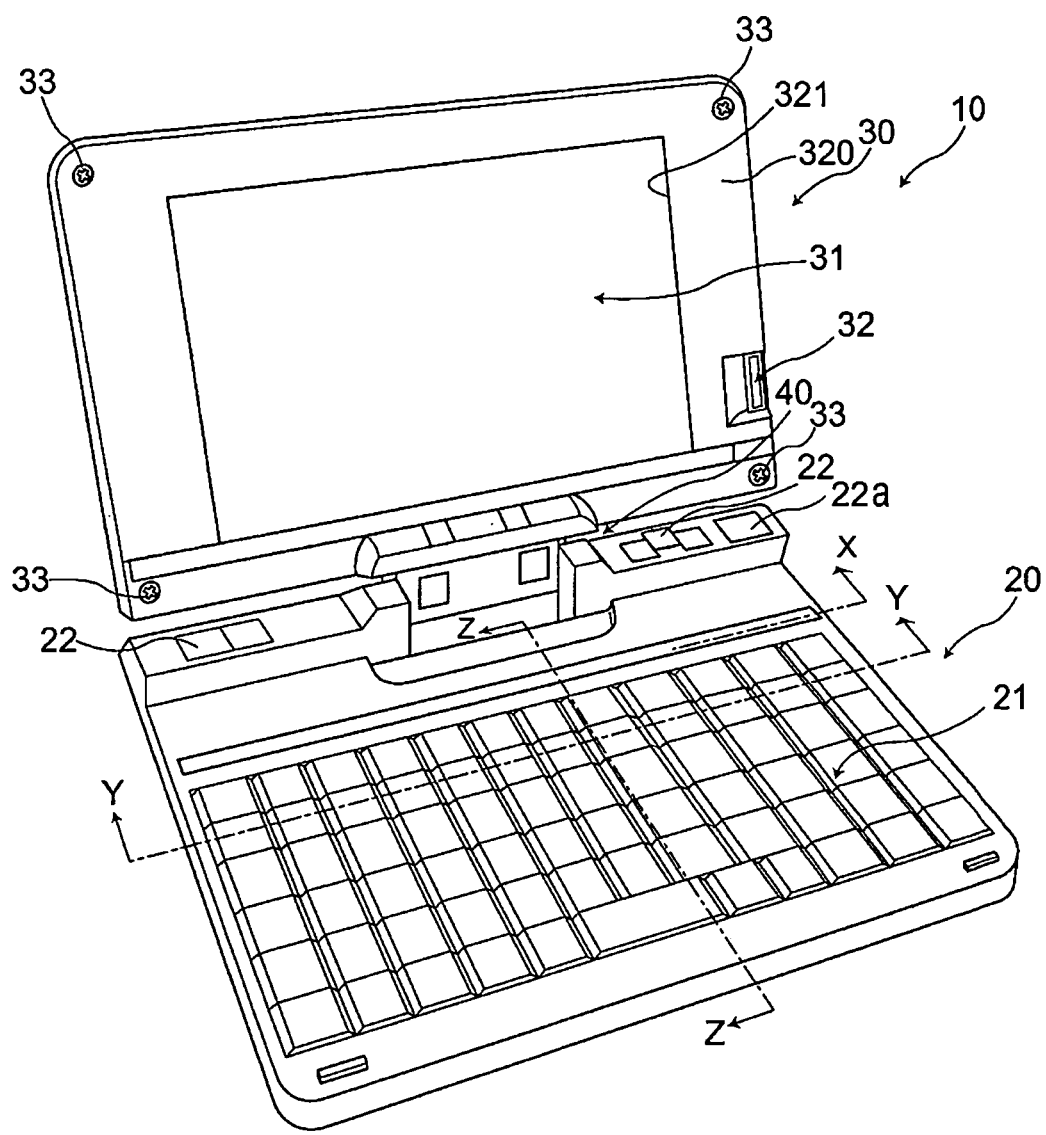
FIG. 1 is a perspective view illustrating an appearance of a note PC in an opened state as one embodiment of an electronic apparatus.
Figure 2:
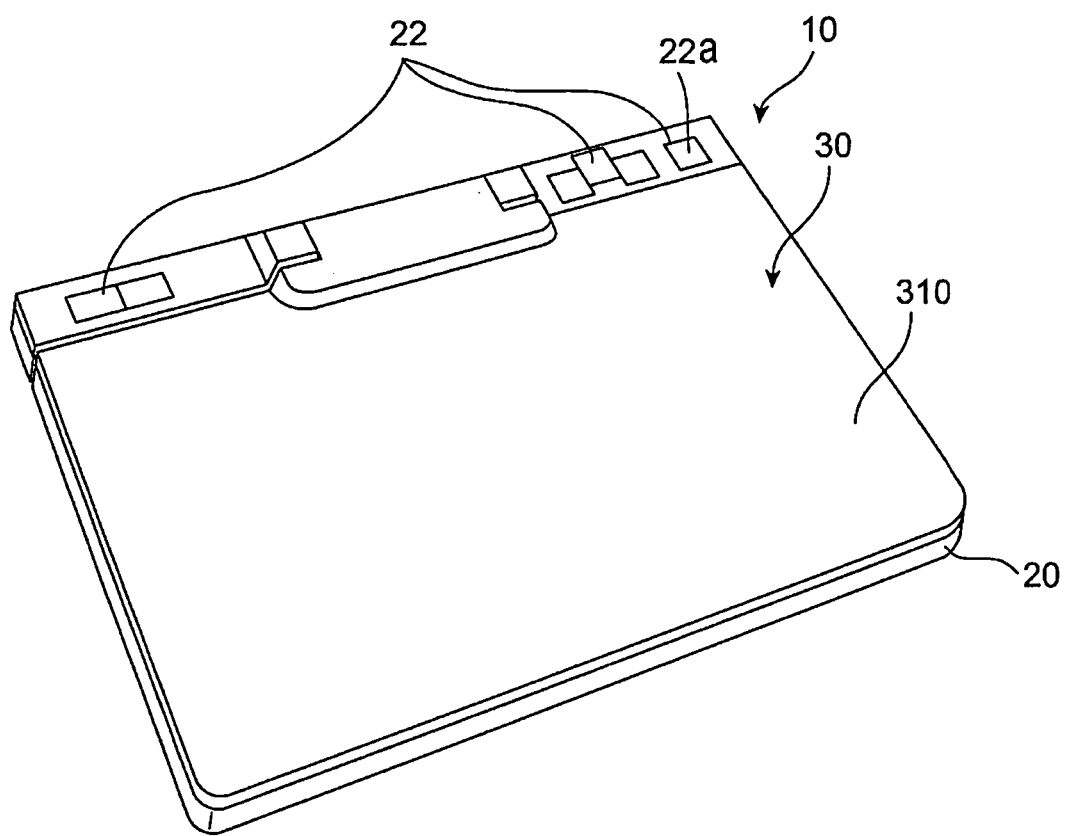
FIG. 2 is a perspective view illustrating an appearance of the same note PC as in FIG. 1 in a first closed state.
Figure 3:
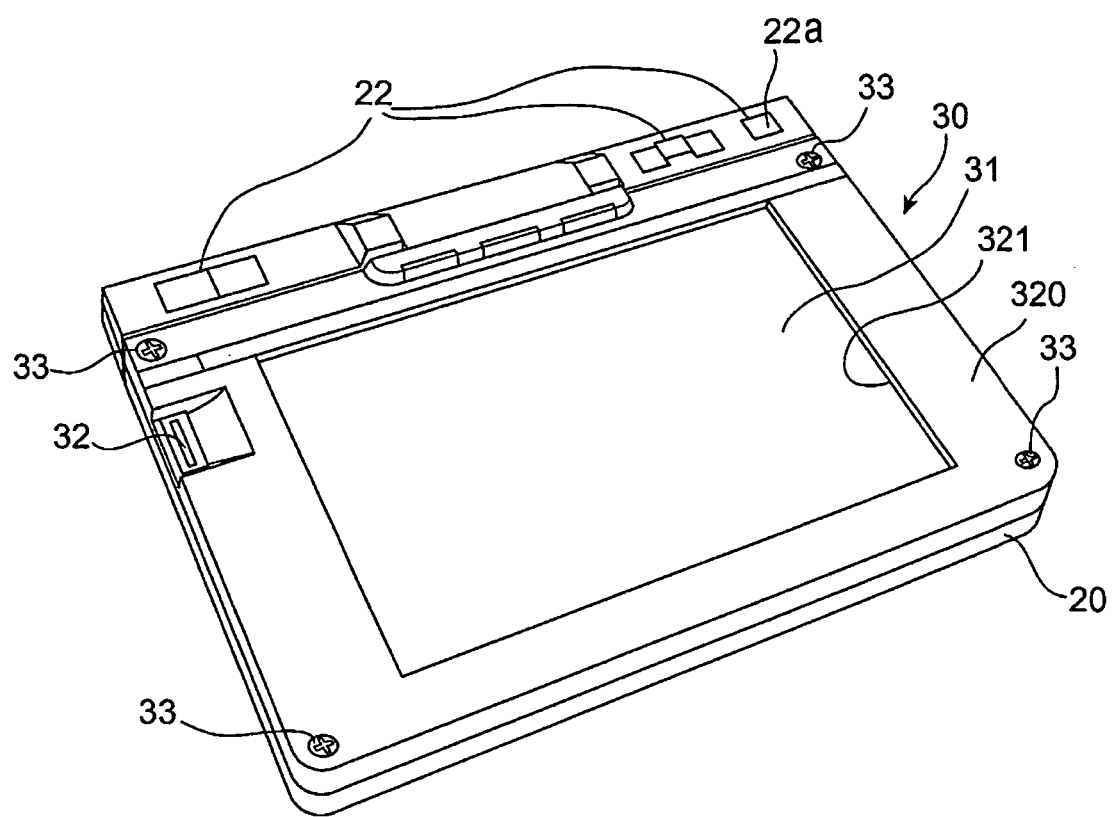
FIG. 3 is a view illustrating an appearance of the same note PC as in FIGS. 1 and 2 in a second closed state.
Figure 4:
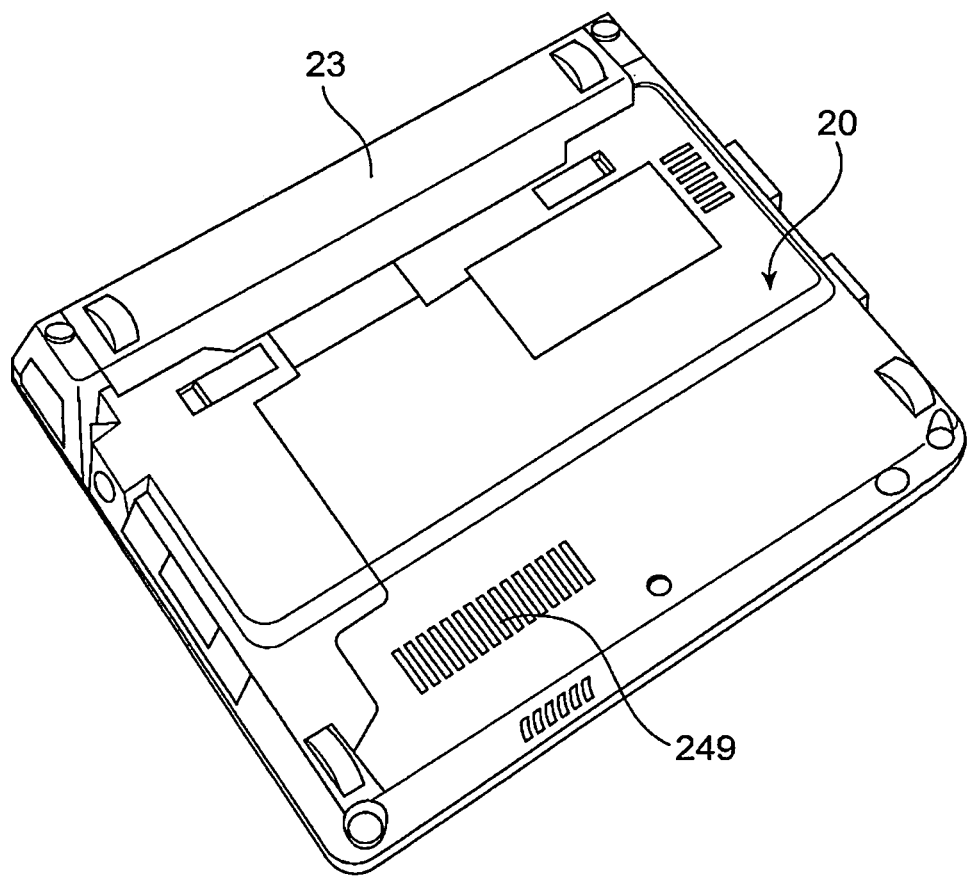
FIG. 4 is a view illustrating a bottom surface of the same note PC as in FIGS. 1 to 3.

FIG. 1 is a perspective view illustrating an appearance of a notebook personal computer (note PC) in an opened state as one embodiment of an electronic apparatus. FIG. 2 is a perspective view illustrating an appearance of the same note PC as that illustrated in FIG. 1 in a first closed state. FIG. 3 is a view illustrating an appearance of the same note PC as those illustrated in FIGS. 1 and 2 in a second closed state. FIG. 4 is a view illustrating a bottom surface of the same note PC as those illustrated in FIGS. 1 to 3.

A note PC 10 includes a main unit 20 and a display unit 30 as illustrated in FIG. 1. The display unit 30 is connected to the main unit 20 by a hinge 40.

The main unit 20 includes a keyboard 21 and various operation buttons 22 such as a power supply button 22a on its upper surface.

Moreover, the display unit 30 includes a display screen 31, a fingerprint sensor 32, and the like.

The hinge 40 is a biaxial hinge having a first rotary shaft and a second rotary shaft. The first rotary shaft is a horizontal shaft that opens and closes the display unit 30 onto the main unit 20. The second rotary shaft is a shaft that is perpendicular to the first rotary shaft and rotates the display unit 30 in the opened state to the main unit 20.

By using the hinge 40, the note PC 10 includes: the opened state illustrated in FIG. 1; the first closed state (see FIG. 2) where the display unit 30 is directly closed onto the main unit 20 from the opened state; and the second closed state (see FIG. 3) where the display unit 30 in the opened state illustrated in FIG. 1 is closed onto the main unit 20 after its direction is inverted.

In the first closed state illustrated in FIG. 2, the display screen 31 is directed toward the main unit 20 and a back surface of the display unit 30 appears on an outer surface of the PC 10. The first closed state corresponds to a state in which the note PC 10 is not used. Additionally, in the second closed sate illustrated in FIG. 3, the display screen 31 appears on the outer surface of the PC 10. The second closed state corresponds to a state in which the note PC 10 can be used as a so-called slate PC.

Here, a housing of the display unit 30 has a base body 310 (see FIG. 2) and a frame body 320. The base body 310 has a plate section which covers the back surface of the display screen 31, and a side surface section which is formed on a peripheral edge of the plate section in a standing manner, and houses therein electronic components. The frame body 320 covers a peripheral edge of the base body 310 having therein an opening 321 that exposes the display screen 31 to the front of the PC 10, and forms a front surface of the display unit 30 together with the display screen 31. The frame body 320 is screwed into the base body 310 with screws 33 located at four corners.

The main unit 20 illustrated in FIG. 4 includes, on its bottom surface, a detachable battery unit 23 and an outlet 249 for exhausting air heated internally.

It is noted that the appearance of the note PC 10 has been summarized, and each of various members, which are needed for later description and have not been described yet, is to be described as needed.

(Structure of Radio Communication Antenna)

Figure 5:
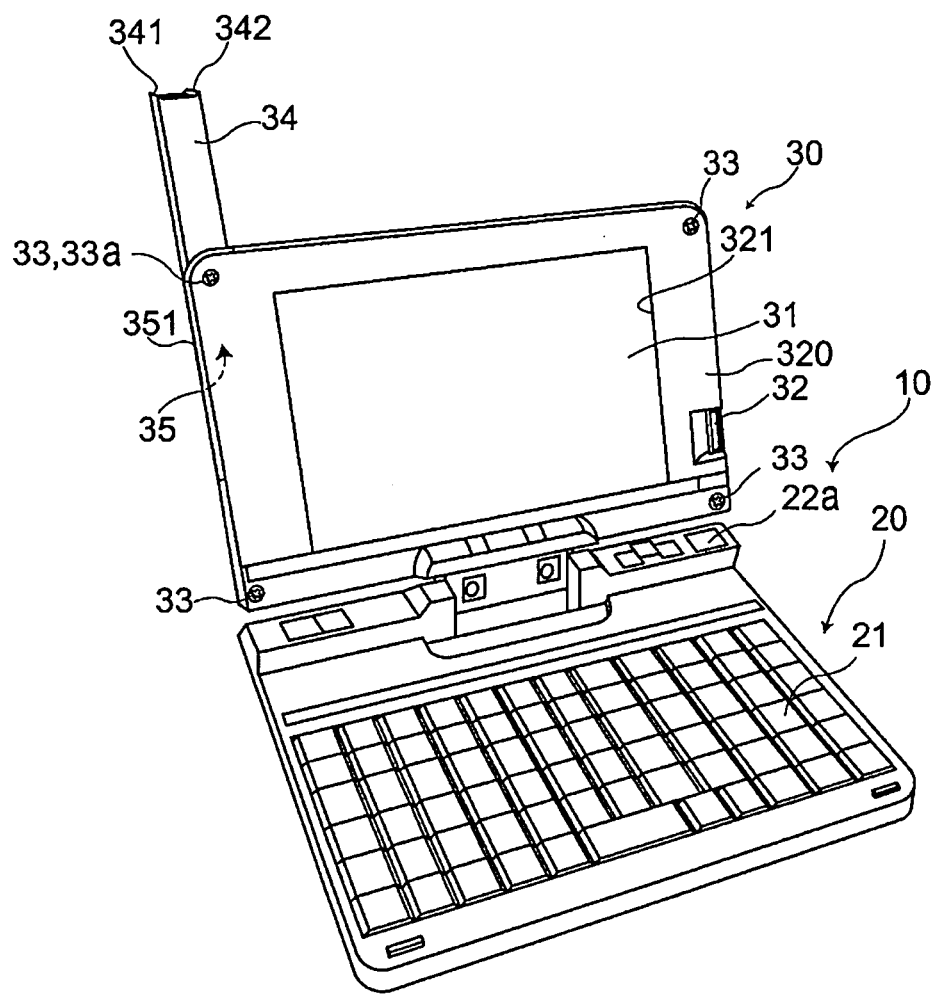
FIG. 5 is an external perspective view illustrating the same note PC as in FIGS. 1 to 4 and a state in which an antenna unit is provided in a standing manner in the opened state.
Figure 6:
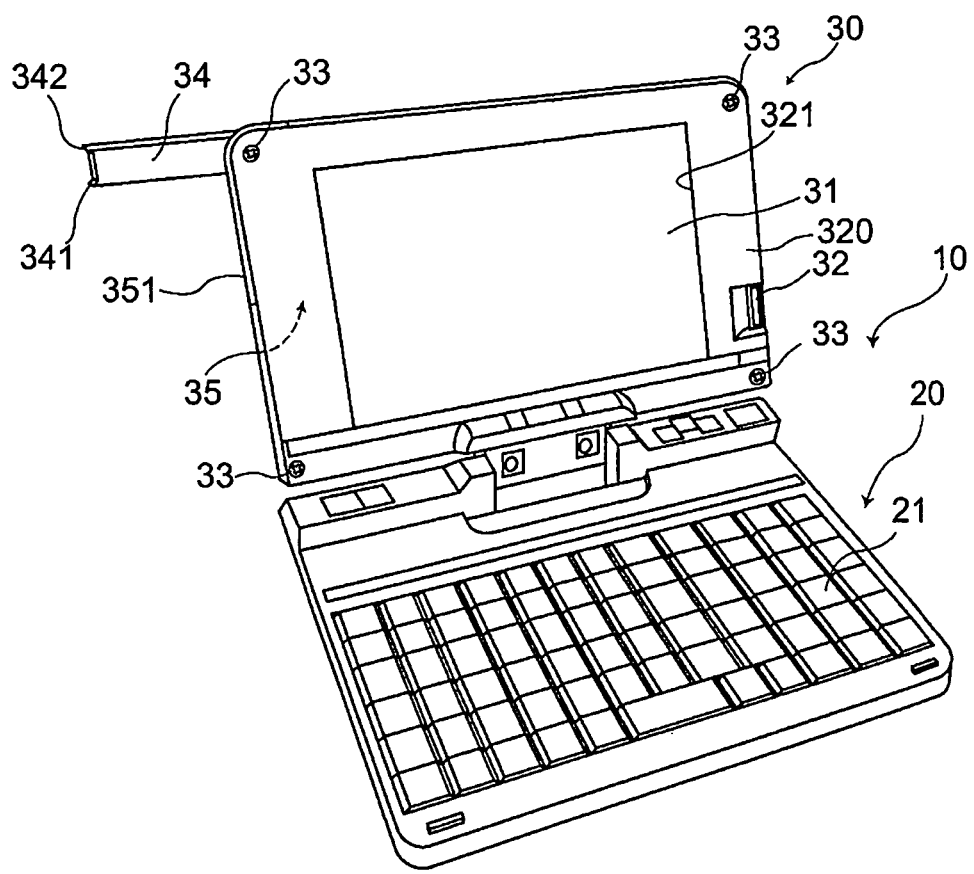
FIG. 6 is an external perspective view illustrating the same note PC as in FIGS. 1 to 4 and a state in which the antenna unit is provided in a horizontally extending manner in the opened state.

FIGS. 5 and 6 are external perspective views of the same note PC as those illustrated in FIGS. 1 to 4, and respectively illustrate a state in which an antenna unit is provided in a standing manner in the opened state and a state in which the antenna unit is provided in a horizontally extending manner in the opened state.

The display unit 30 of the note PC 10 has a plate piece-like antenna unit 34. The antenna unit 34 is housed in an antenna housing section 35 of the display unit 30 to be rotatable about a screw 33a on an upper left end of the display unit 30 illustrated in FIG. 5. The antenna unit 34 is pulled out from the antenna housing section 35 and stopped at two positions, that is, the state in which it is vertically erected as illustrated in FIG. 5 and the state in which it is horizontally extended as illustrated in FIG. 6. Here, the antenna housing section 35 is formed at a position which includes an upper left corner of the display unit 30 of the base body 310 (see FIG. 2) and extends downward along a left side from the upper left corner. The antenna housing section 35 is covered with the frame body 320 on its front surface and has an opening 351 for pulling out the housed antenna unit 34 on its left side surface.

Moreover, the antenna unit 34 has, on its top end portion, first and second protrusions 341 and 342 each protruding in an extension direction of a corresponding side. Functions of these first and second protrusions 341 and 342 will be described later.

Figure 7:
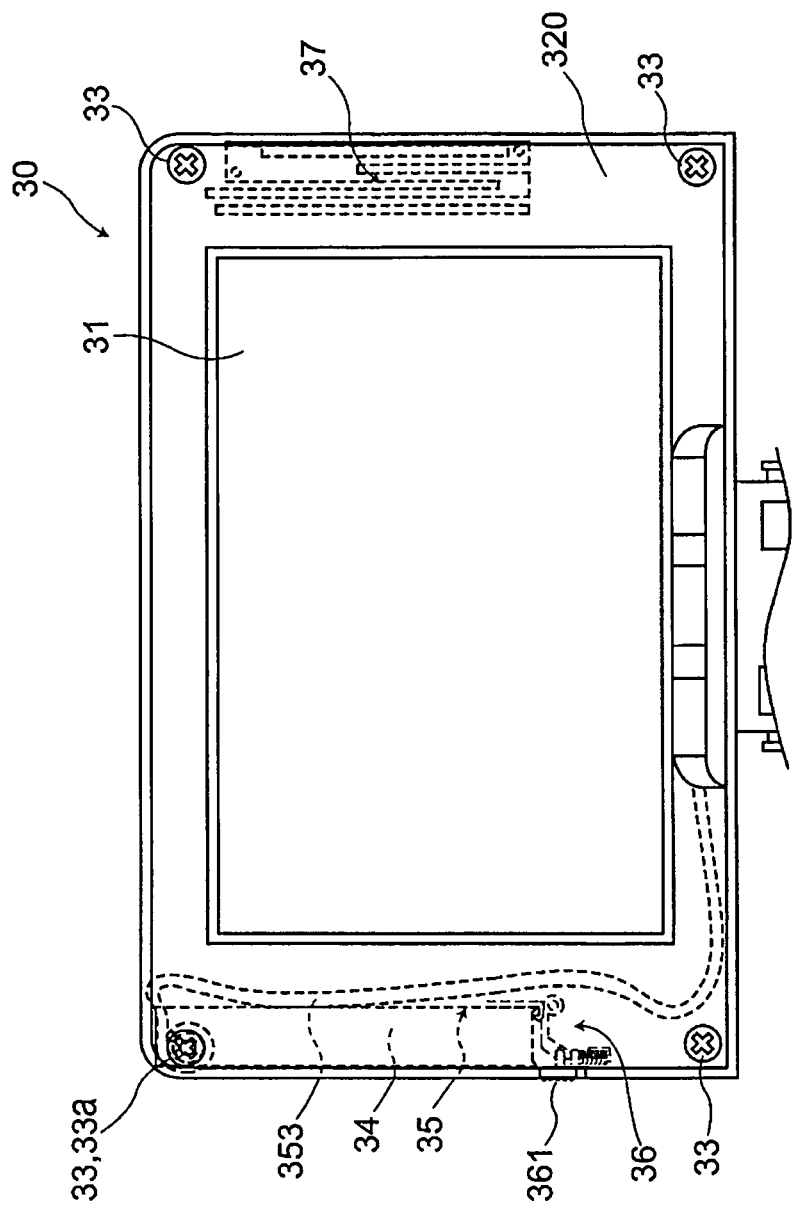
FIG. 7 is a front view illustrating a housed state of the antenna unit.

FIG. 7 is a front view illustrating a housed state of the antenna unit 34.

When being housed in the antenna housing section 35, the antenna unit 34 is locked by a locking mechanism 36 so as not to protrude from the antenna housing section 35. When the user slides a slide lever 361, the locking mechanism 36 is released to allow the antenna unit 34 to be pulled out from the antenna housing section 35.

Further, a cable 353 electrically connected to the antenna unit 34 is provided in the display unit 30. The cable 353 is wound about the center of rotation of the antenna unit 34 in a direction of being rewound when the antenna unit 34 is rotated in a direction by being pulled out from the antenna housing section 35.

Moreover, the display unit 30 includes one more antenna 37 firmly built-in on its right side. The antenna unit 34 on the left side and the antenna 37 on the right side are paired to form a diversity antenna.

Figure 8:
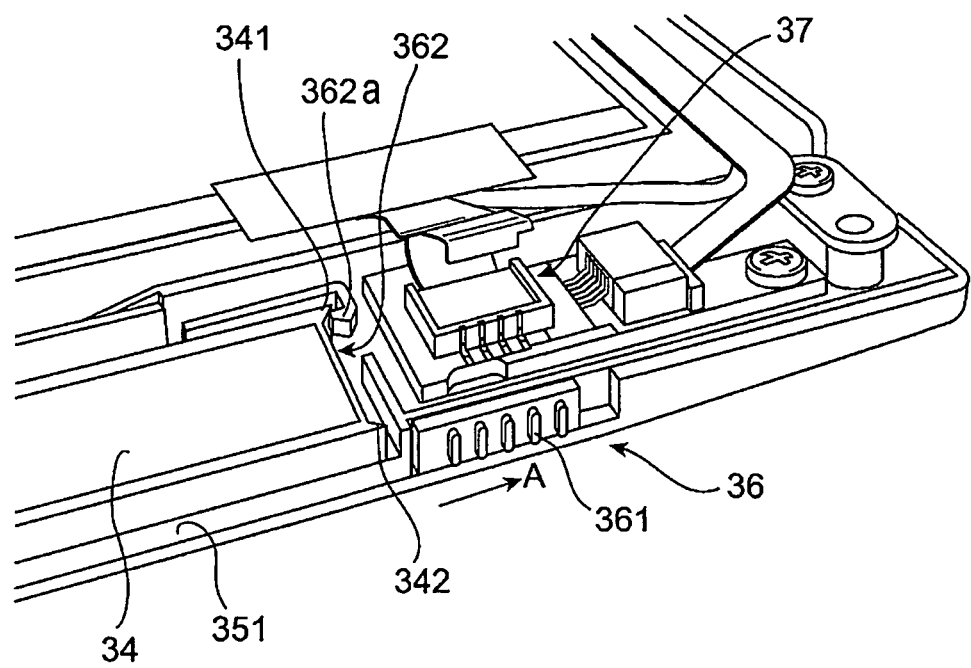
FIG. 8 is a perspective view illustrating a top end portion of the antenna unit and a locking mechanism which locks the antenna unit, after detaching a frame body covering the surrounding of a display screen in front of a display unit.

FIG. 8 is a perspective view illustrating a top end portion of the antenna unit 34 and the locking mechanism 36 locking the antenna unit 34 after detaching the frame body 320 (see FIG. 7), which covers the surrounding of the display screen 31, of a front surface of the display unit 30.

As described above, the antenna unit 34 has the first and second protrusions 341 and 342 on its top end portion. The first protrusion 341 protrudes so as to extend an inner side of the antenna housing section 35 in a state where the antenna unit 34 is housed in the antenna housing section 35. The second protrusion 342 extends along the side surface of the opening 351 of the antenna housing section 35 in the state where the antenna unit 34 is housed in the antenna housing section 35. When the antenna unit 34 is housed in the antenna housing section 35, the first protrusion 341 is locked by a locking claw 362a that forms the locking mechanism 36. Consequently, the antenna unit 34 is locked and held in the antenna housing section 35. When the user slides the slide lever 361 included in the locking mechanism 36, in a direction of an arrow A, the locking by the locking claw 362a is released and the antenna unit 34 can be pulled out from the antenna housing section 35.

Note that, on the locking mechanism 36, a small-size circuit board 37 is provided and thus part of the locking mechanism 36 is hidden under the circuit board 37.

Figure 9:
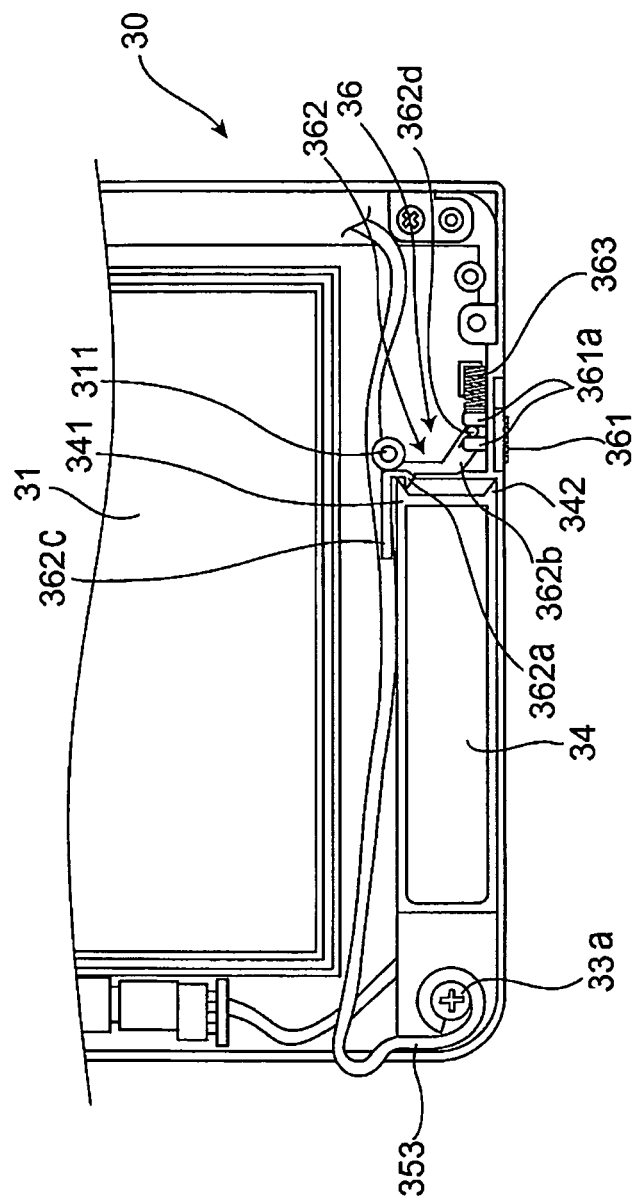
FIG. 9 is a plan view illustrating a portion of the antenna unit and the locking mechanism after detaching a circuit board that covers the locking mechanism.
Figure 10:
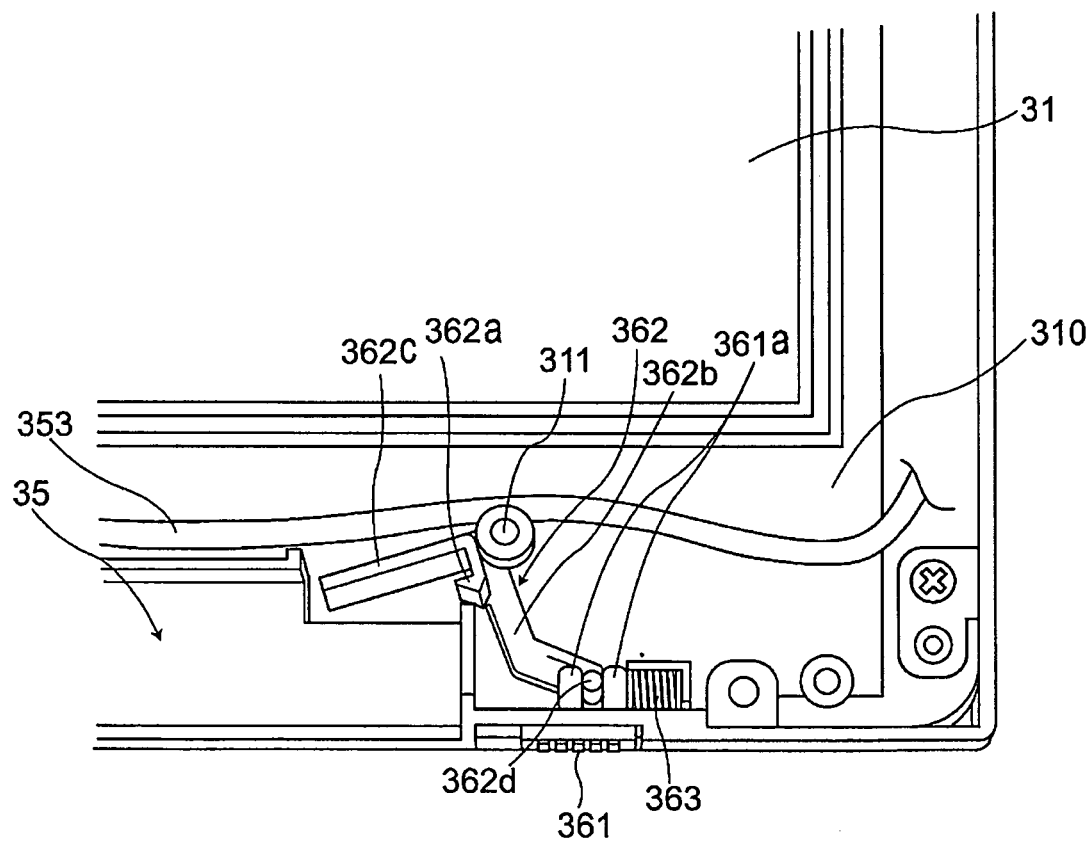
FIG. 10 is a view illustrating the locking mechanism with the slide lever slid.

FIG. 9 is a plan view illustrating the portions of the antenna unit 34 and the locking mechanism 36 after detaching the circuit board that covers the locking mechanism 36. FIG. 10 is a view illustrating the locking mechanism 36 with the slide lever 361 slid. In FIG. 10, the antenna unit 34 is not illustrated.

The locking mechanism 36 includes the slide lever 361, a locking member 362 and a coil spring 363.

The slide lever 361 is provided at a position adjacent to the top end portion of the antenna unit 34 in the state of being housed in the antenna housing section 35 on the side surface of the display unit 30. The slide lever 361 has two leg sections 361a extending in a fork shape in the housing of the display unit through an opening (not illustrated) on the side surface of the display unit 30.

The locking member 362 is rotatably pivoted by a boss 311 protruding from a plate section, which covers the back surface of the display screen 31, of the base body 310 that forms the housing of the display unit 30. The locking member 362 includes the locking claw 362a, an operation receiving arm 362b and a push-out arm 362c.

The operation receiving arm 362b extends toward the slide lever 361 and has, on its top end portion, a boss 362d placed between the two leg sections 361a of the slide lever 361. The operation receiving arm 362b rotates the locking member 362 upon reception of the slide operation of the slide lever 361.

When the slide lever 361 is slid, the locking member 362 is rotated as illustrated in FIG. 10. By the rotation of the locking member 362, the locking claw 362a releases the locking of the first protrusion 341 (see FIG. 9) of the antenna unit 34. Further, the push-out arm 362c pushes the side surface of the inner side of the antenna unit 34 to push out the antenna unit 34 from the antenna housing section 35 upon release from the locking by the locking claw 362a. At this time, the cable 353 is wound about the center of the rotation of the antenna unit 34 in the direction described above, and therefore a force is applied in a direction where the antenna unit 34 pushed out by the push-out arm 362c is further pushed out. This implements an easy pullout of the antenna unit 34 from the antenna housing section 35.

The user can further pull out the antenna unit 34 by hooking his/her fingernail in the second protrusion 342 of the antenna unit 34 pushed out from the antenna housing section 35.

The coil spring 363 pushes the leg section 361a of the slide lever 361 and urges the locking member 362 in a direction that maintains a position where the locking claw 362a locks the first protrusion 341 of the antenna unit 34.

Figure 11:
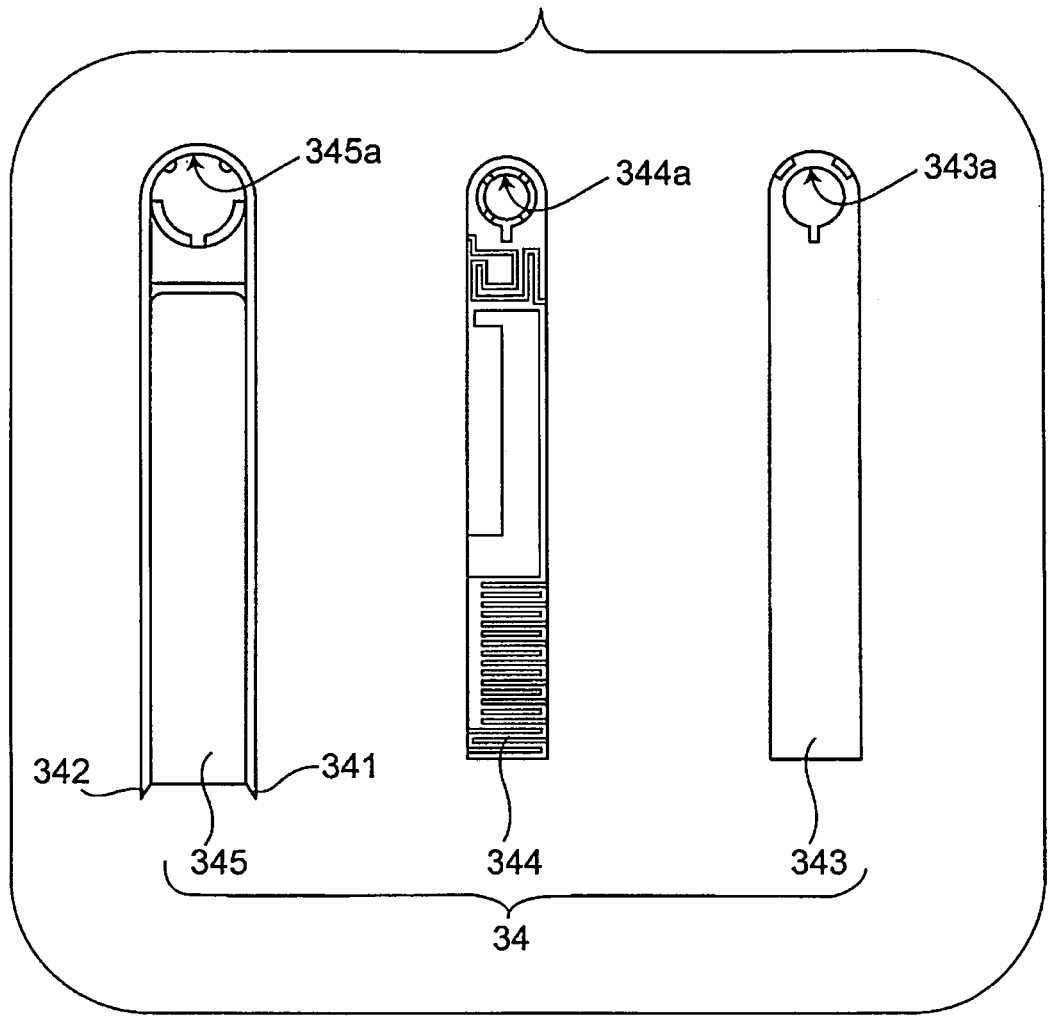
FIG. 11 is an exploded view of the antenna unit.

FIG. 11 is an exploded view of the antenna unit 34.

The antenna unit 34 is formed of a plate piece-like upper cover 343, an antenna 344 and a lower cover 345. The upper cover 343 has a through-hole 343a on its one end side. The antenna 344 and the lower cover 345 have through-holes 344a and 345a, respectively, at positions corresponding to the through-hole 343a. The antenna unit 34 is assembled in such a manner that the antenna 344 is fitted into the lower cover 345 and the upper cover 343 is attached to the lower cover 345. The upper cover 343 and the lower cover 345 are formed of flexible materials such as elastomer, rubber (NBR, silicone rubber, CR), sheet (PET, PC) and the like. Further, any antenna such as a FPC antenna, a substrate antenna, a plate antenna or the like may be used as the antenna 344.

Figure 12:
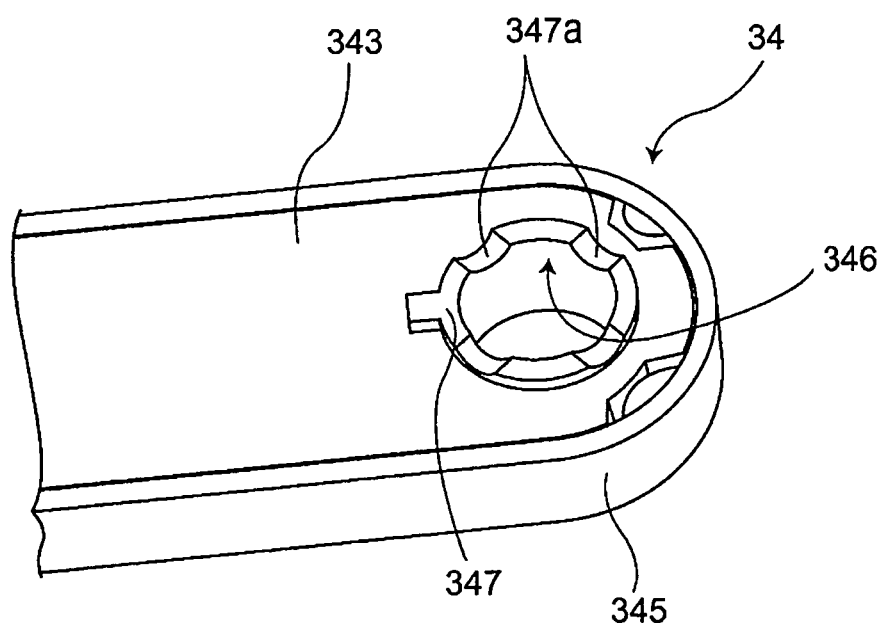
FIG. 12 is a perspective view illustrating the center portion of rotation of the assembled antenna unit seen from an upper cover side.

FIG. 12 is a perspective view illustrating the center portion of a rotation of the assembled antenna unit 34 seen from the upper cover 343 side.

As illustrated in FIG. 12, the antenna unit 34 has an insertion hole 346. A boss 312 (see FIG. 13), which is disposed on the plate section of the housing of the display unit 30 in a standing manner, is inserted into the insertion hole 346. A bearing section 347, which forms an edge of the insertion hole 346, has four concave sections 347a that surround the insertion hole 346. The boss 312 corresponds to the protruding section. The insertion hole 346 is fixed to the antenna 344 so as to be electrically conducted therewith by a predetermined fixing method such as soldering, caulking, bonding, screwing and the like.

Figure 13:
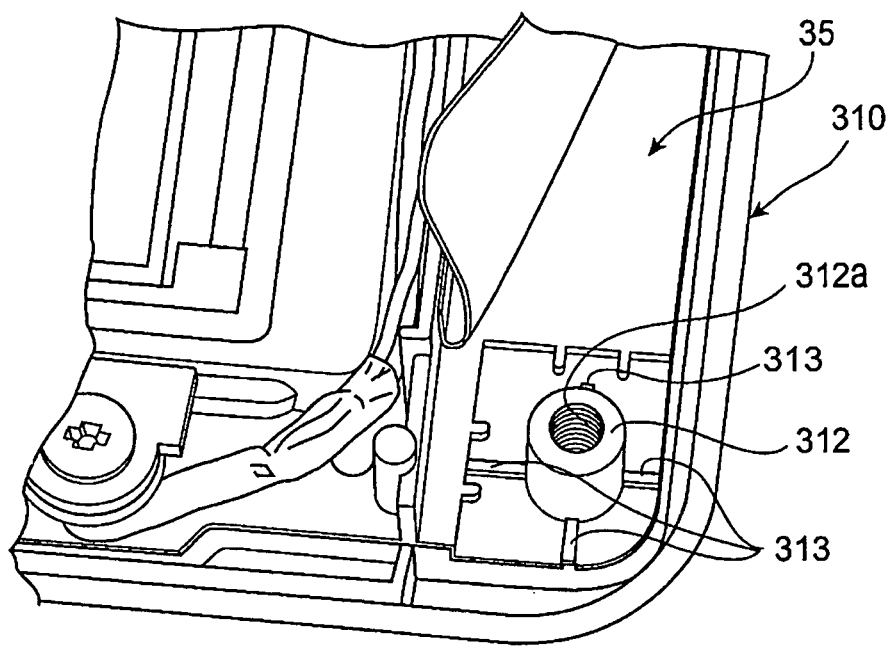
FIG. 13 is a view illustrating a rotary shaft portion of the antenna unit of an antenna housing section.

FIG. 13 is a view illustrating a rotary shaft of the antenna unit 34 of the antenna housing section 35.

At an upper left corner, which is one end of the antenna housing section 35, of the display unit 30, the boss 312 is disposed in a standing manner from the base body 310 that forms the housing of the display unit 30. A female screw 312a is formed at the center of the boss 312. Additionally, at the base of the boss 312, four ribs 313 are formed at positions separated from one another on the base body 310.

Figure 14:
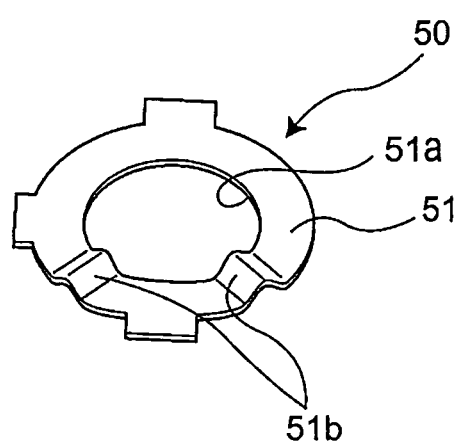
FIG. 14 is a view illustrating a plate member.

FIG. 14 is a view illustrating a plate member 50 to be fitted into the boss 312 illustrated in FIG. 13.

The metal member 50 illustrated in FIG. 14 has two convex sections 51b at positions, being separated from each other, on an annular section 51 having a hole 51a into which the boss 312 (see FIG. 13) is to be inserted.

Figure 15:
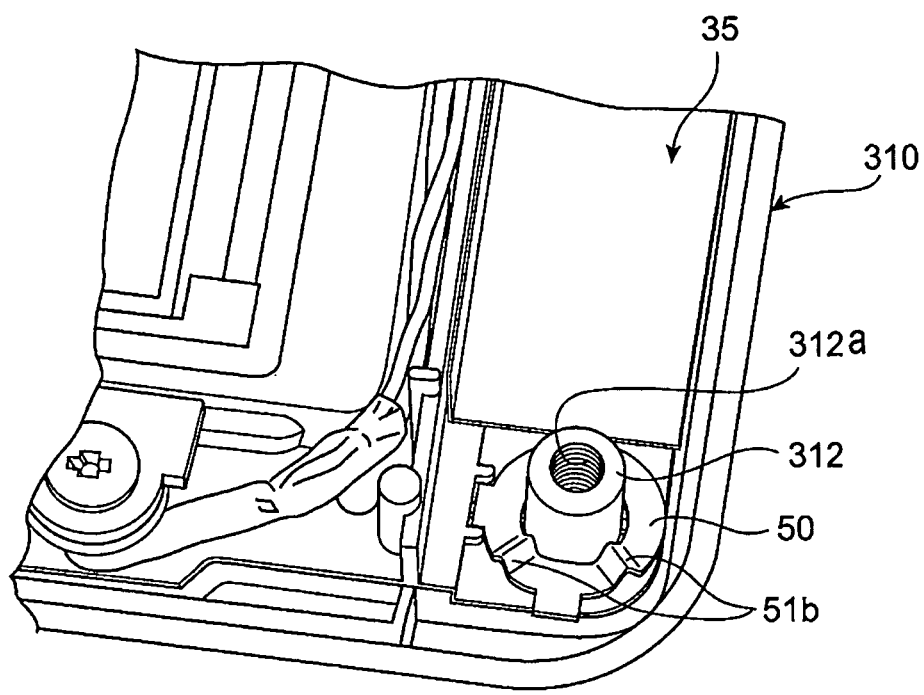
FIG. 15 is a view illustrating a state in which the plate member illustrated in FIG. 14 is fitted into a boss illustrated in FIG. 13.

FIG. 15 is a view illustrating a state in which the plate member 50 illustrated in FIG. 14 is fitted into the boss 312 illustrated in FIG. 13.

The plate member 50 is attached to the boss 312 in a direction where each convex section 51b is placed between adjacent ribs 313. Accordingly, when the convex sections 51b are pressed, the plate member 50 is elastically deformed.

The antenna unit 34 is mounted on the boss 312 after the plate member 50 is mounted thereon as illustrated in FIG. 15. The boss 312 is inserted into the insertion hole 346 of the antenna unit 34 in a direction where the end surface having the concave sections 347a of the bearing section 347 (see FIG. 12) of the antenna unit 34 comes in contact with the plate member 50. Here, there are prepared three attitudes including: a state in which the antenna unit 34 is housed in the antenna housing section 35; a state in which the antenna unit 34 rotates by 90 degrees and extends horizontally as illustrated in FIG. 6; and a state in which the antenna unit 34 further rotates by 90 degrees and extends upwardly as illustrated in FIG. 5. In each of the attitudes, the convex sections 51b of the plate member 50 are fitted into any two of the four concave sections 347a of the bearing section 347 of the antenna unit 34 to hold the antenna unit 34 at the corresponding attitude. When a force in the rotational direction of the antenna unit 34 is applied to the antenna unit 34 which is in any one of the three attitudes, the plate member 50 is deformed as described above and its locking is released, so that the antenna unit 34 rotates.

As described above, the plate member 50 is mounted on the boss 312 and the antenna unit 34 is further mounted thereon, and the frame body 320 (see, for example, FIGS. 1, 3 and 5), which forms the housing of the display unit 30, is still further mounted thereon. Under such a mounted state, the frame body 320 is screwed by the screw 33a (see FIG. 5, for example) by using the female screw 312a of the boss 312.

If the support of the antenna unit 34 onto the rotary shaft and the fixing of the frame body 320 are separately made, there is a possibility that a thickness of the display unit 30 is increased accordingly. However, in this embodiment, the antenna unit 34 and the frame body 320 are integrally screwed together, thereby contributing to a reduction in thickness of the display unit 30. Moreover, in this embodiment, clicking is implemented by using the thin plate member 50, and this point also contributes to the reduction in thickness of the display unit 30.

(Switch Structure)

Figure 16:
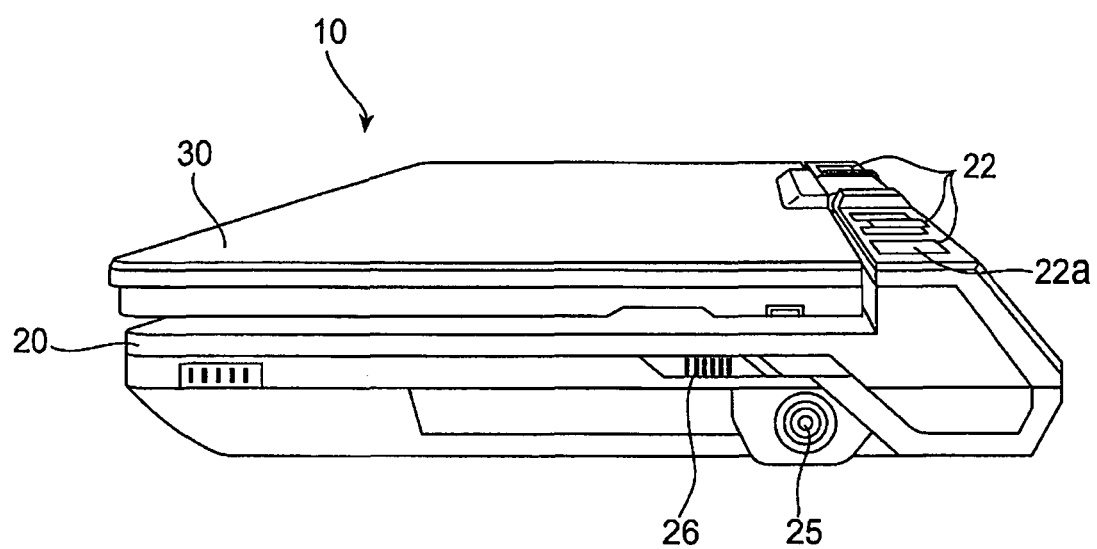
FIG. 16 is a perspective view illustrating a side surface of the same note PC as those having been described so far in the first closed state.
Figure 17:
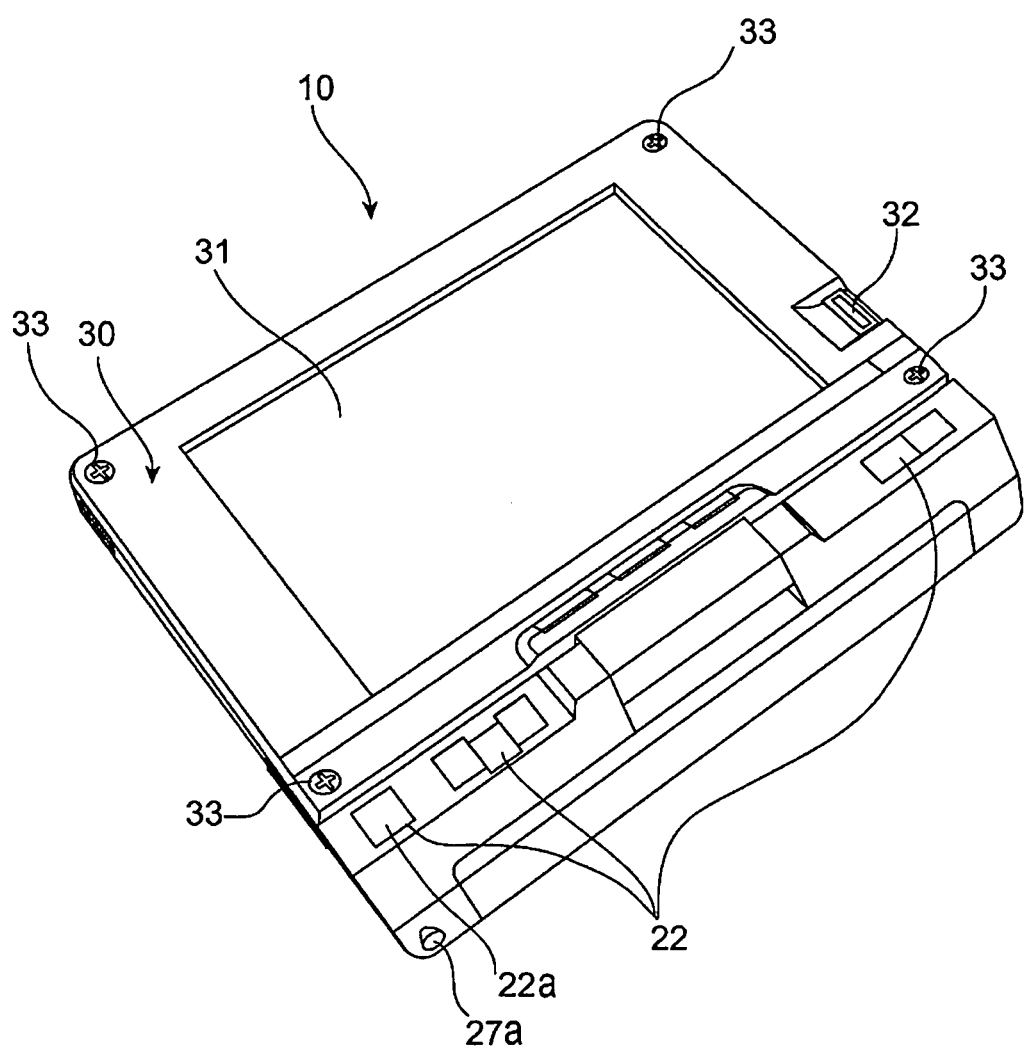
FIG. 17 is a perspective view illustrating a rear side of the same note PC as those having been described so far in the second closed state.
Figure 18:
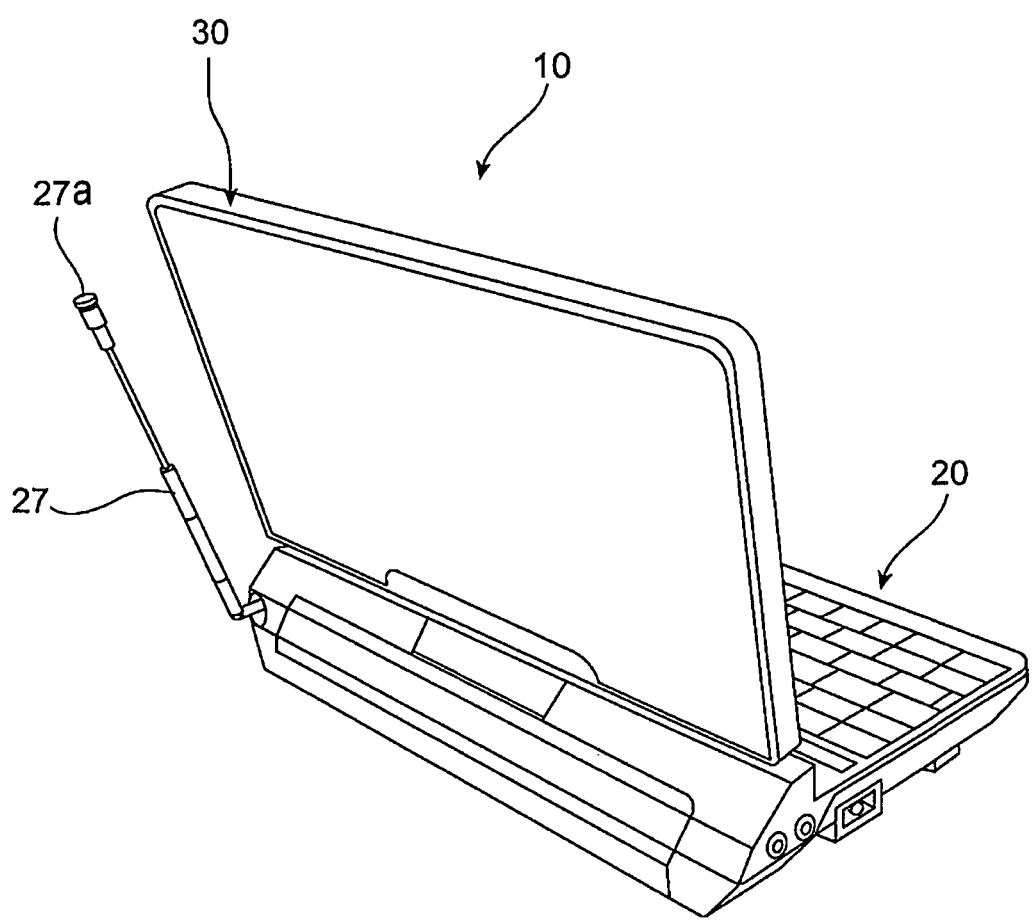
FIG. 18 is a perspective view illustrating a back surface of the note PC in the opened state.

FIG. 16 is a perspective view illustrating a side surface of the same note PC as those having been described so far in the first closed state. FIG. 17 is a perspective view illustrating a rear side of the note PC in the second closed state. FIG. 18 is a perspective view illustrating a back surface of the note PC in the opened state.

On the side surface illustrated in FIG. 16, a power supply plug 25 for receiving power supply from an AC adaptor and an operation member 26 are illustrated.

Further, FIG. 17 illustrates a top end portion 27a of a rod antenna 27 (see FIG. 18).

Furthermore, FIG. 18 illustrates the rod antenna 27 in a state where it is pulled out from the main unit 20.

In the note PC 10, the rod antenna 27 is housed in the main unit 20. The rod antenna 27 can be pulled out from the main unit 20 by pinching the top end portion 27a and can be folded as illustrated in FIG. 18.

Here, as will be described later, the operation member 26 is used for a switch operation of a changeover switch, which is provided at the back of the rod antenna 27 with the rod antenna 27 placed therebetween, and is devised to prevent interference with the rod antenna 27.

Figure 19:
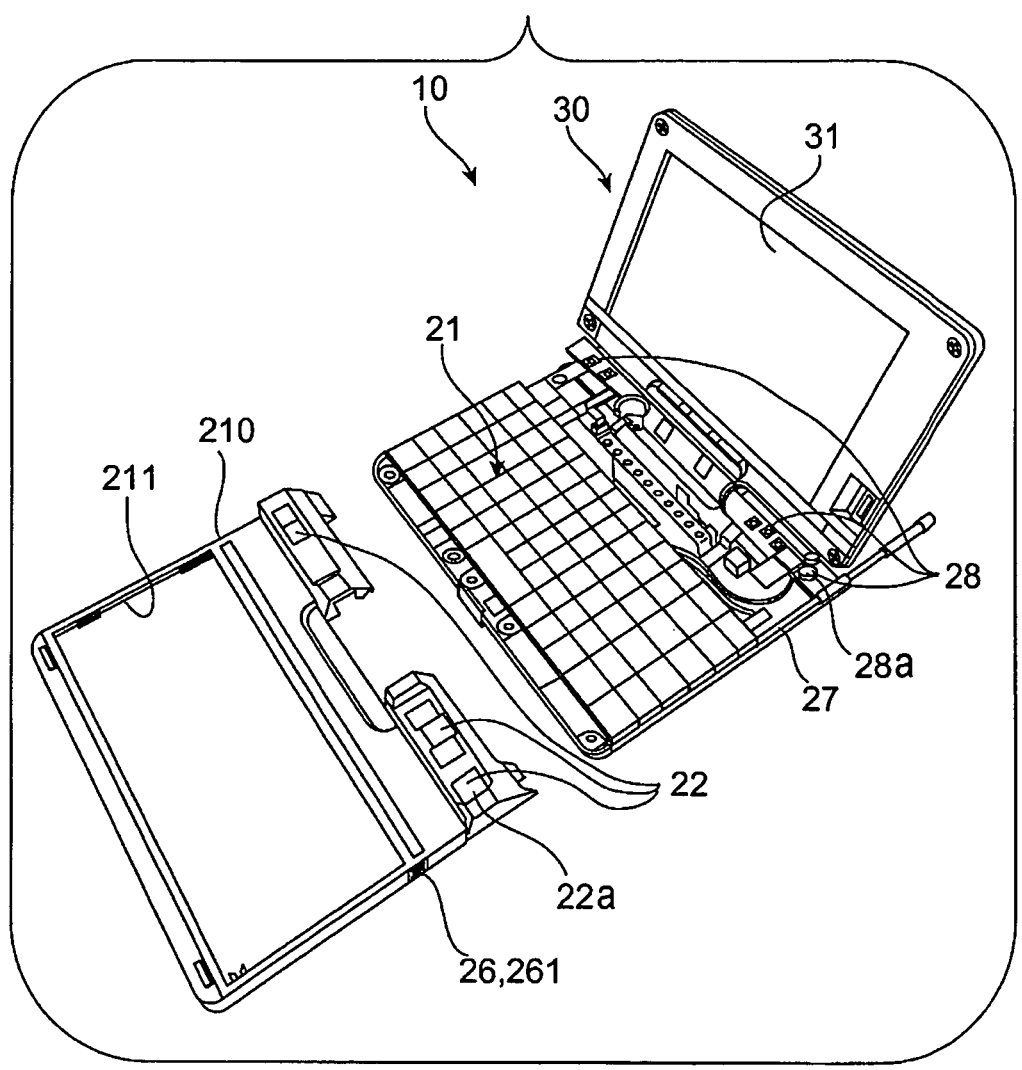
FIG. 19 is a view illustrating the note PC in the opened state after the upper cover forming a housing of a main unit is detached, together with the detached upper cover.
Figure 20:
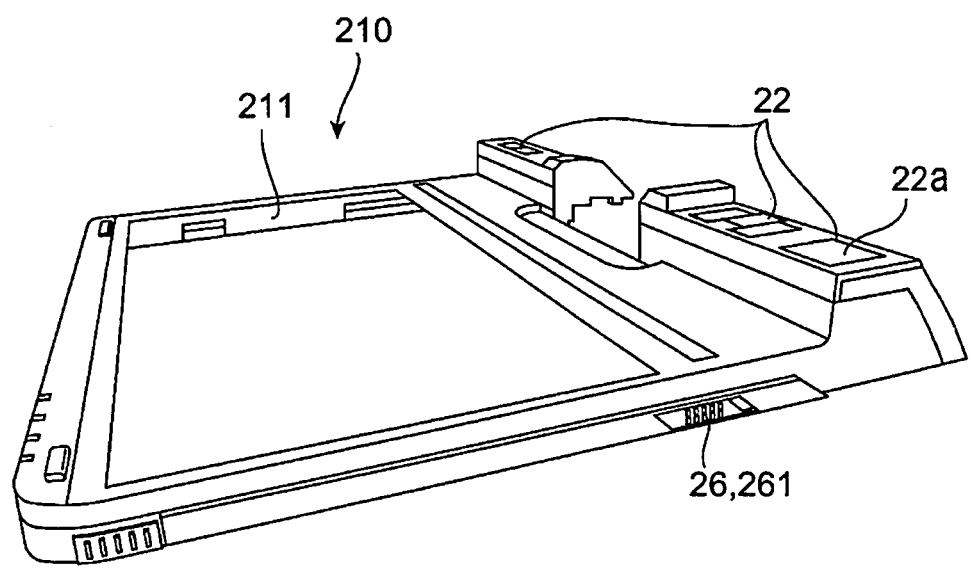
FIG. 20 is a view illustrating only the upper cover seen from an angle at which a side surface of the upper cover can be seen.

FIG. 19 is a view illustrating the note PC 10 in the opened state with an upper cover 210 forming the housing of the main unit 20 detached therefrom, together with the detached upper cover 210. FIG. 20 is a view illustrating only the upper cover 210 seen from an angle at which a side surface of the upper cover 210 can be seen.

The housing of the main unit 20 is composed of the upper cover 210 illustrated in FIG. 19 and the base body forming the bottom portion of the main unit 20 (see FIG. 4), the upper cover 210 and the base body extending in substantially parallel with each other. The base body and the upper cover 210 form a side surface for connecting the peripheral edge of an upper surface (upper cover 210) and that of a bottom surface (base body) to each other.

Inside the housing of the main unit 20, the circuit board extends in substantially parallel with the upper surface and the bottom surface.

The upper cover 210 is a frame-shape cover member having an opening 211 through which an upper portion of the keyboard 21 mounted on the main unit 20 is exposed. The upper cover 210 further includes the various operation buttons 22 such as the power supply button 22a.

Moreover, multiple detection switches 28 for detecting depressions of the various operation buttons 22, such as the power supply switch 28a, are provided at positions right below the operation buttons 22 located on the upper cover 210 of the main unit 20. Further, in the main unit 20, the rod antenna 27 is housed at a position adjacent to just the inner side of an operation piece 261 (to be described later) of the operation member 26. FIG. 19 illustrates a state in which part of the rod antenna 27 is drawn.

Figure 21:
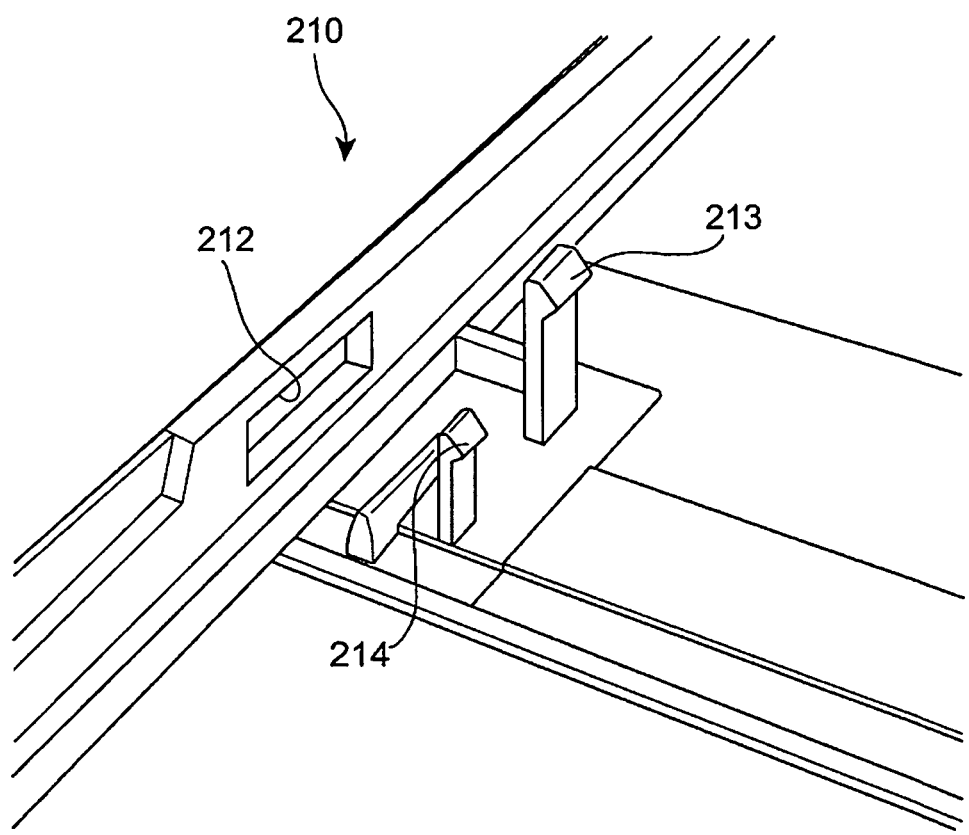
FIG. 21 is a view illustrating an inner side of a portion, where an operation member is placed, of the upper cover after putting the upper cover upside down.

FIG. 21 is a view illustrating an inner side of a portion where the operation member 26 is placed of the upper cover 210 after putting the upper cover 210 upside down. In FIG. 21, the operation member 26 (see FIGS. 19 and 20) is also detached.

As illustrated in FIG. 21, the upper cover 210 has on its side surface an opening 212 through which the operation member 26 passes. Further, the upper cover 210 has two hooks 213 and 214 inside the opening 212. The larger-sized hook 213 of these two hooks 213 and 214 is one for assembling the upper cover 210.

The smaller-sized hook 214 has a function of supporting the operation member 26 and a function of restricting the range of the slide operation of the operation member 26.

Figure 22:
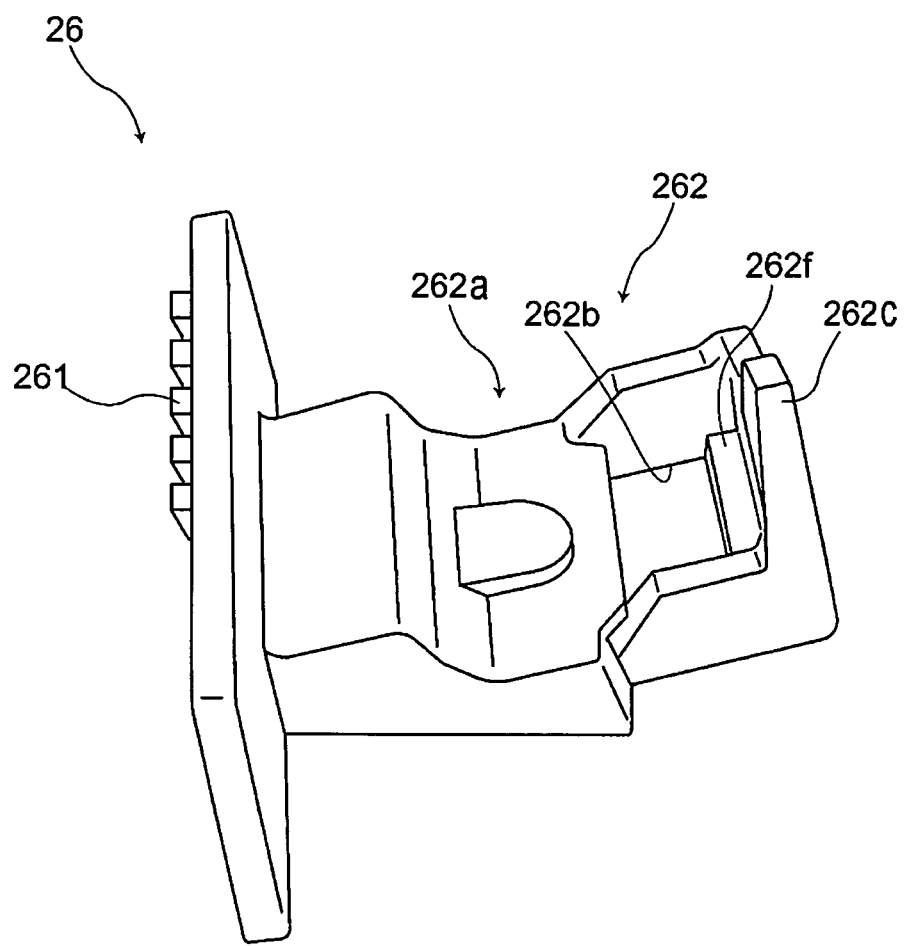
FIG. 22 is a view illustrating only the operation member detached from the upper cover.
Figure 23:
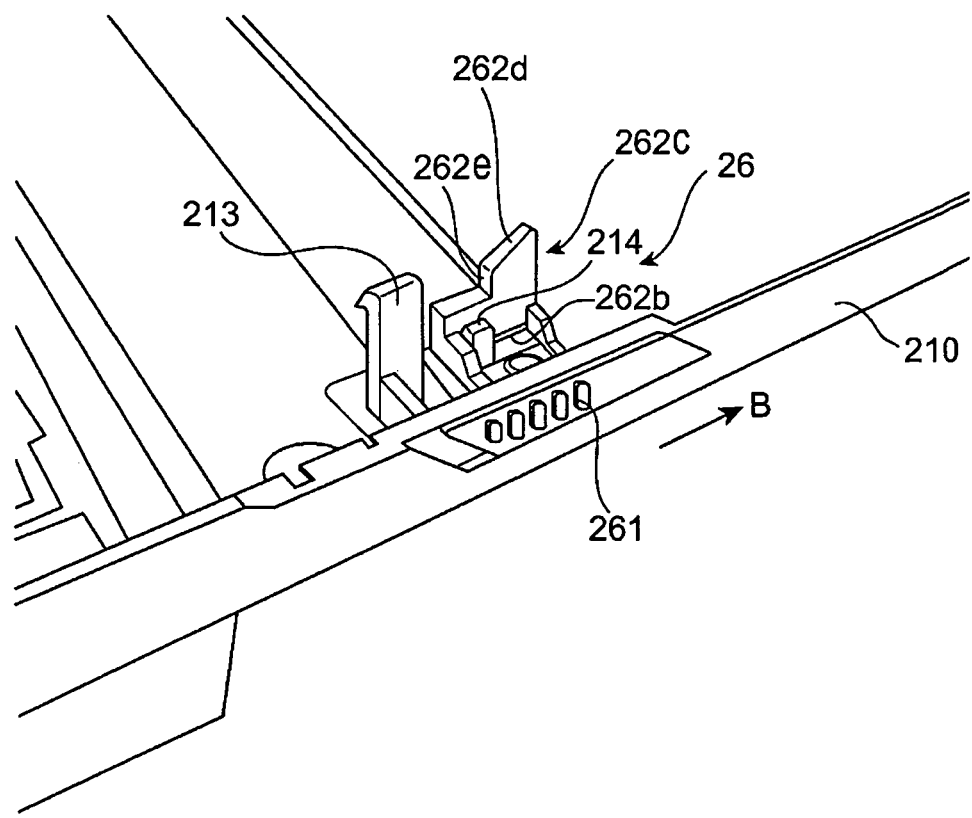
FIG. 23 is a view illustrating a state in which the operation member is mounted on the upper cover (before operation)
Figure 24:
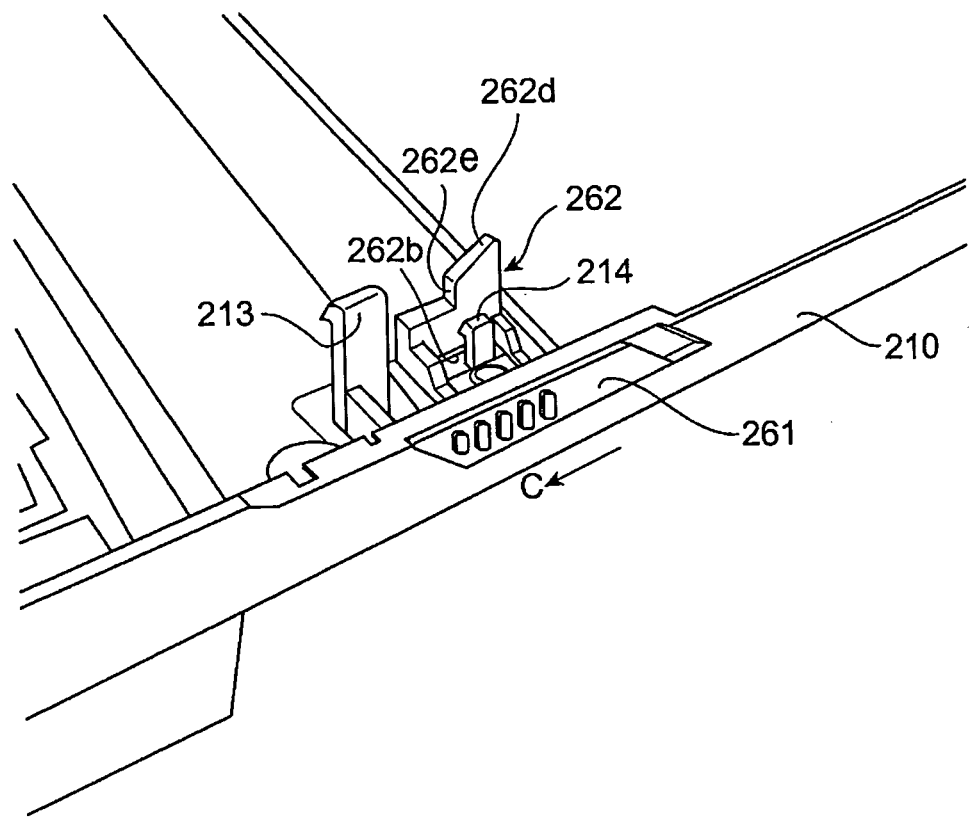
FIG. 24 is a view illustrating a state in which the operation member is mounted on the upper cover (after operation)

FIG. 22 is a view illustrating only the operation member 26 detached from the upper cover 210. In FIG. 22, illustrated is a perspective view of the operation member 26 positioned upside down as in FIG. 21. FIG. 23 is a view illustrating a state in which the operation member 26 is attached to the upper cover 210 (before operation). FIG. 24 is a view illustrating a state in which the operation member 26 is attached to the upper cover 210 (after operation).

The operation member 26 illustrated in FIG. 22 has the operation piece 261 and an operation arm 262. The operation piece 261 is located outside the housing of the main unit 20 and receives a slide operation by the user. The operation arm 262 inwardly extends from the operation piece 261 through the opening 212 illustrated in FIG. 21 and switches the changeover switch to be described later. Here, the changeover switch (specifically, a changeover lever 291 of a changeover switch 29 illustrated in FIG. 25) is arranged in a position that interferes with the rod antenna 27 when the opening 212 and the changeover switch are linearly connected to each other. The operation arm 262 has a recess 262a that bypasses the rod antenna 27. Moreover, the operation arm 262 has an opening 262b and a changeover section 262c. The opening 262b is one through which the hook 214 illustrated in FIG. 21 passes. The changeover section 262c comes in contact with the changeover switch at its top end portion to switch the changeover switch. The changeover section 262c has an inclined surface 262d and a vertical wall surface 262e continuous to the inclined surface 262d as illustrated in FIGS. 23 and 24. The inclined surface 262d comes in contact with the changeover switch at the time of assembling the upper cover 210 and guides the operation piece 261 to an initial position (position where the operation piece 261 is moved in a direction of an arrow B (hereinafter direction B) as illustrated in FIG. 23) irrespective of where it is located in the slide range. Further, the vertical wall surface 262e comes in contact with the changeover switch after the upper cover 210 is assembled and switches the changeover switch upon reception of the slide operation through the operation piece 261. The operation member 26 also has a locking base 262f by which the hook 214 (see FIG. 21) is to be locked.

The operation member 26 is arranged in such a manner that the hook 214 passes through the opening 262b (see FIG. 22) and is locked by the locking base 262f (see FIG. 22) of the operation member 26 as illustrated in FIGS. 23 and 24. In this state, the changeover switch comes in contact with the inclined surface 262d at the time of assembling the upper cover 210 to move the operation member 26 in the direction B as illustrated in FIG. 23, so that the changeover switch and the vertical wall surface 262e come in contact with each other. When the operation piece 261 is slid in a direction of an arrow C illustrated in FIG. 24 after the upper cover 210 is assembled, the changeover switch is pushed by the vertical wall surface 262e to switch the changeover switch. An amount of slide operations of the operation piece 261 is restricted by the hook 214 inserted into the opening 262b.

Figure 25:
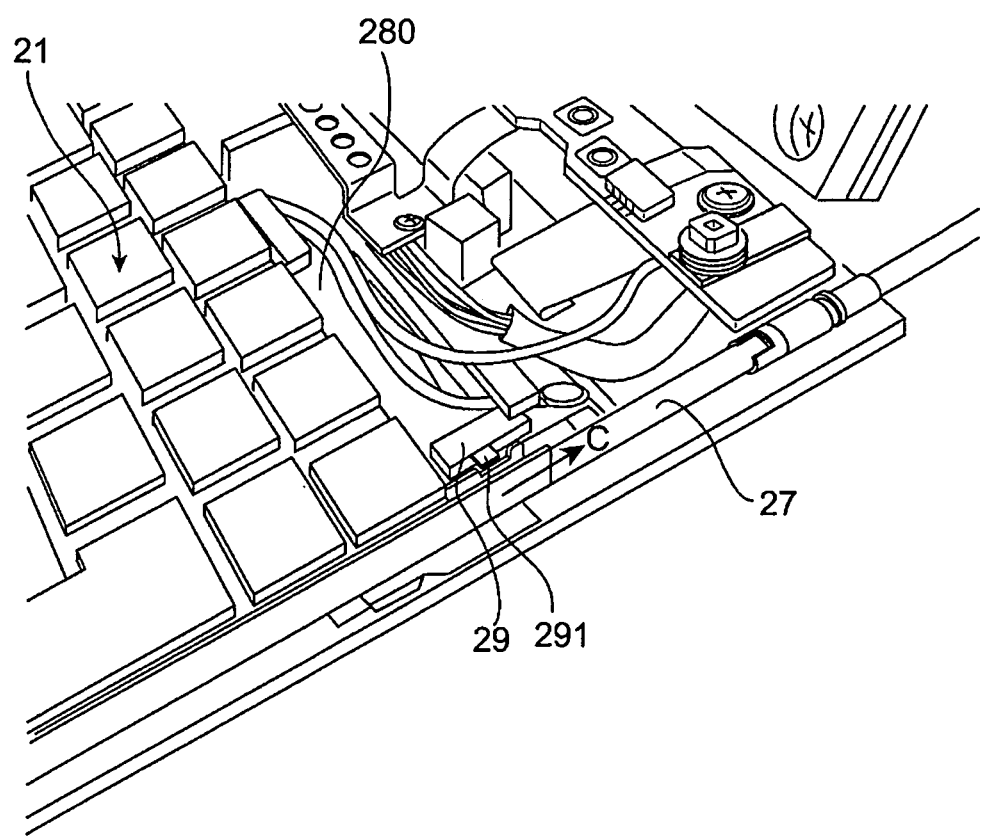
FIG. 25 is a view illustrating a changeover switch placed on a circuit board.

FIG. 25 is a view illustrating the changeover switch arranged on a circuit board.

A circuit board 280 extends under the keyboard 21. The changeover switch 29 is mounted on the end portion of the circuit board 280 on the rod antenna 27 side. The changeover switch 29 has the changeover lever 291. When the changeover lever 291 is slid in a direction of an arrow C, the state of the changeover switch 29 is changed. A spring, which urges the changeover lever 291 in a direction opposed to the arrow C, is built in the inside of the changeover switch 29. When the slide operation of the changeover lever 291 in the direction of the arrow C is stopped, the changeover lever 291 is automatically returned to the original initial position by the spring. The arrow C, which indicates the direction of the slide operation of the operation piece 261 illustrated in FIG. 24, corresponds to the arrow C indicated in FIG. 25, and both of the arrows C indicate the same direction when the upper cover 24 is assembled.

The changeover switch 29 is mounted on a position along one side of the rod antenna 27 on the circuit board 280. The rod antenna 27 is placed in a space formed between the circuit board 280 and the side surface of the housing of the main unit 20. When the inside of the main unit 20 is viewed through the opening 212 (see FIG. 21) of the upper cover 210 assembled with the operation member 26 removed, the rod antenna 27 is present between the opening 212 and the changeover switch 29. For this reason, the rod antenna 27 prevents the changeover lever 291 of the changeover switch 29 from being recognized from outside. The recess 262a of the operation member 26 illustrated in FIG. 22 is used to bypass the rod antenna 27 placed at the obstructive position.

Figure 26:
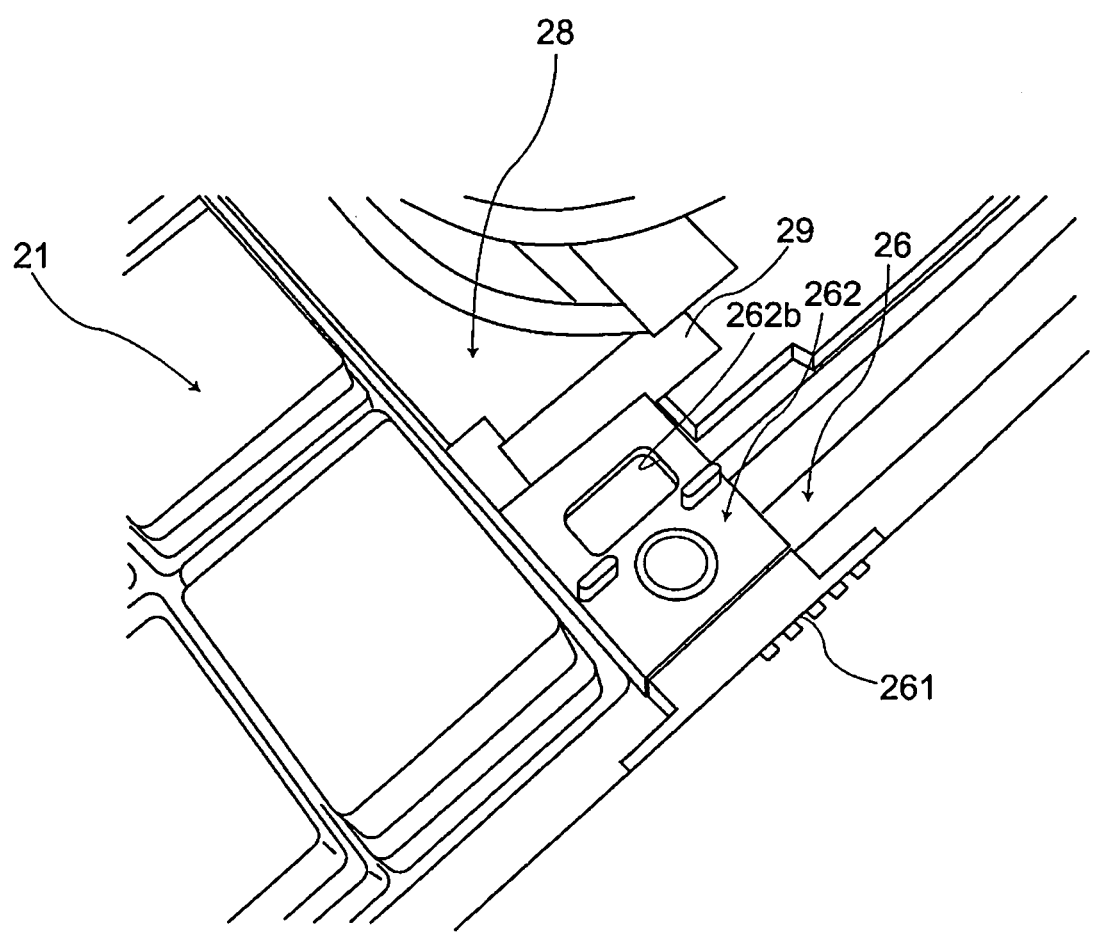
FIG. 26 is a view illustrating a state in which the operation member detached from the upper cover is directly placed on the main unit without upper cover.
Figure 27:
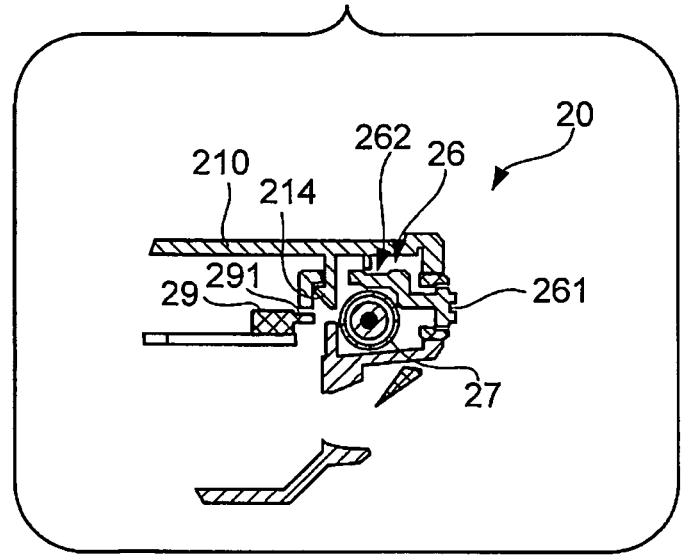
FIG. 27 is a partially cross-sectional view taken along an arrow X in FIG. 1 in a state in which the upper cover is assembled.

FIG. 26 is a view illustrating a state in which the operation member 26 detached from the upper cover 210 is directly placed on the main unit 20 without the upper cover 210. FIG. 27 is a partially cross-sectional view taken along an arrow X in FIG. 1 in a state in which the upper cover 210 is assembled.

The operation member 26 is structured to operate the changeover switch 29 while bypassing the rod antenna 27.

Note that, an example has been described in which the rod antenna 27 is placed between the operation piece 261 and the changeover switch 29. However, the component, which is present between the operation piece 261 and the changeover switch 29, does not have to be the rod antenna 27. Even when, for example, a stylus pen with which a plane surface is traced and other components are provided therebetween, it is possible to operate the changeover switch provided at the back of the component by using the operation member 26 having a structure that bypasses and thus avoids the components.

(Grounding Structure Through Cable)

Figure 28:
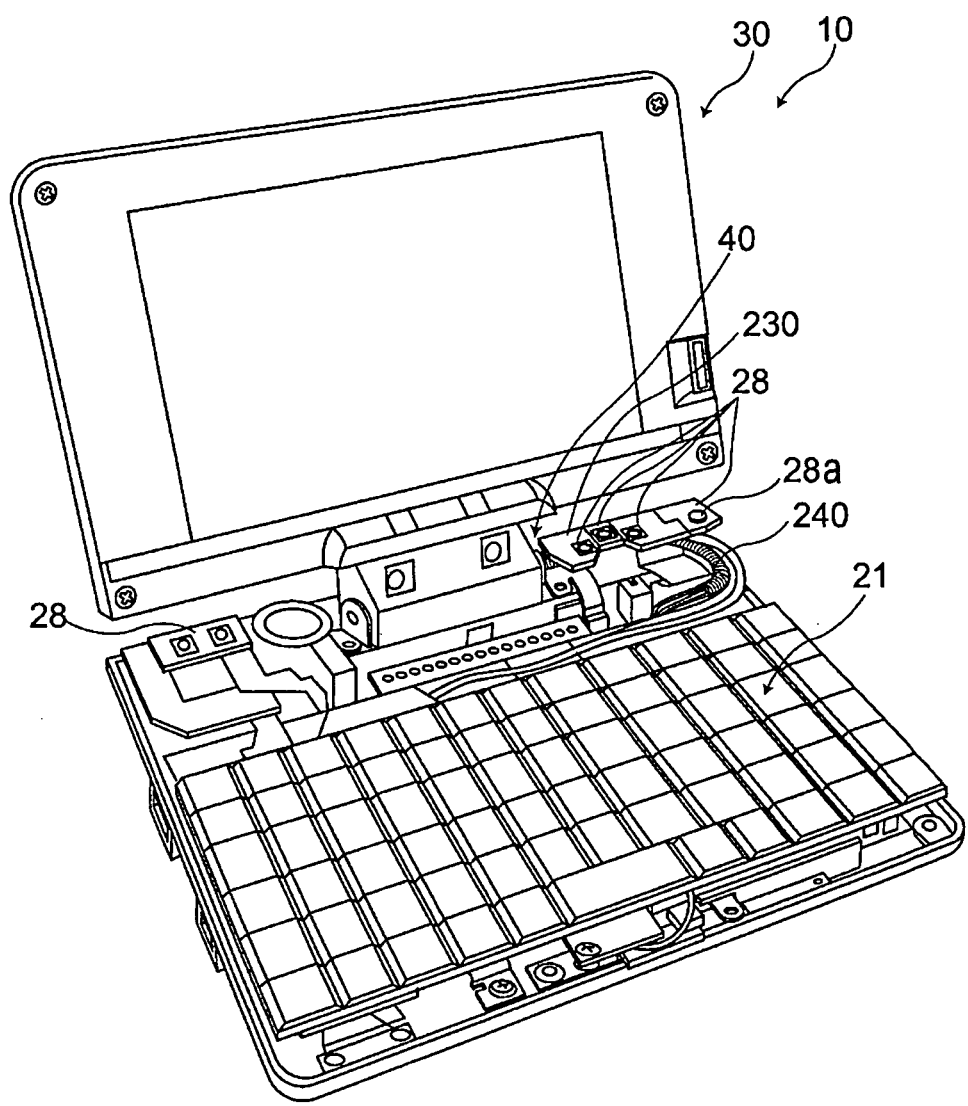
FIG. 28 is a perspective view illustrating the note PC in the opened state from which the upper cover of the main unit is detached.

FIG. 28 is a perspective view illustrating the note PC 10 in the opened state from which the upper cover 210 of the main unit 20 is detached.

A switch board 230 mounting thereon the four switches 28 including a power supply switch 28a is illustrated on the right side of the hinge 40 illustrated in FIG. 28. A cable 240, which connects between the inside of the main unit 20 and that of the display unit 30, is also illustrated.

Figure 29:
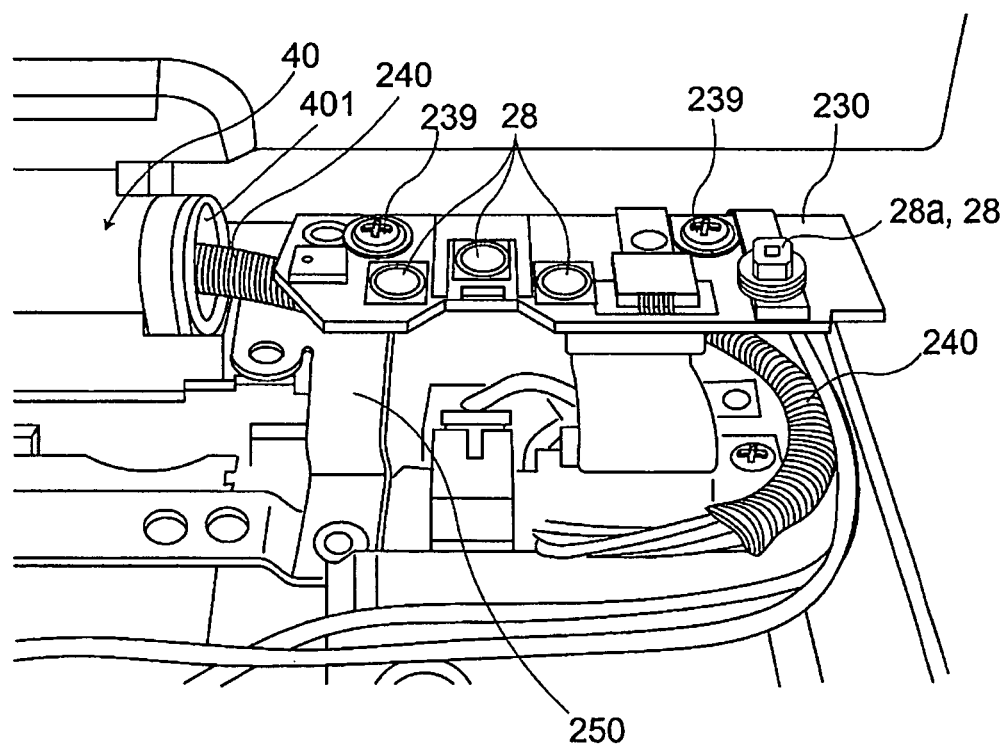
FIG. 29 is an expanded perspective view illustrating a portion of a switch board.

FIG. 29 is an expanded perspective view illustrating a portion of the switch board 230.

The hinge 40 has a through-hole 401 which allows the cable 240 extending from the inside of the main unit 20 to pass through the through-hole 401 to the inside of the display unit 30.

The switch board 230 is screwed into the housing of the main unit 20 with two screws 239 with the cable 240 disposed between itself and a grounding member 250 placed on the housing.

Figure 30:
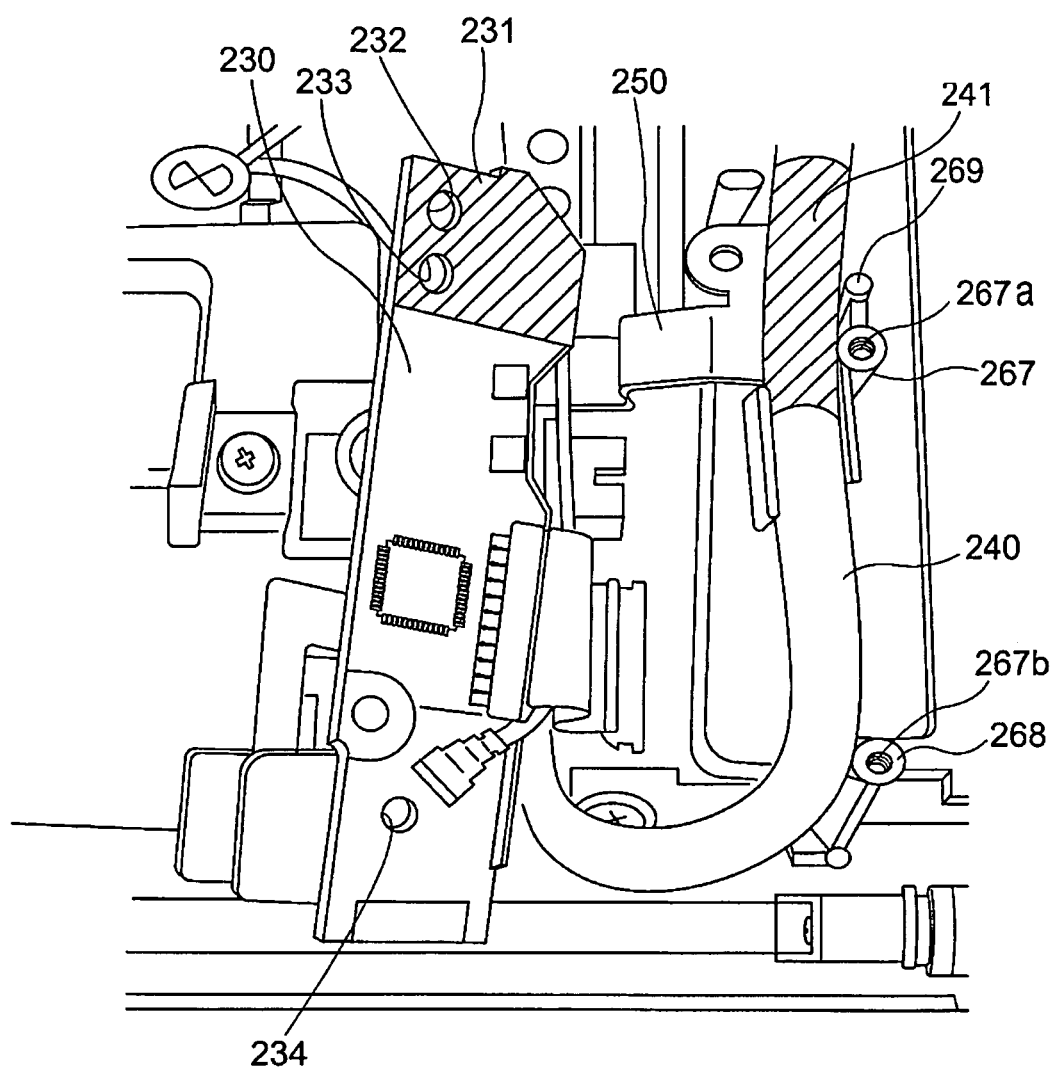
FIG. 30 is a view illustrating a back surface of the switch board and a portion of a cable hidden by the switch board after the switch board is unscrewed.

FIG. 30 is a view illustrating a back surface of the switch board 230 and a portion of the cable 240 hidden by the switch board 230, after the switch board 230 is unscrewed and detached from the housing of the main unit 20.

As illustrated in FIG. 29, the grounding member 250 made of a metal piece is placed in the vicinity of an inlet of the through-hole 401, on the main unit side, of the hinge 40 on the housing of the main unit, and the cable 240 passes thereon. As illustrated in FIG. 30, an outer surface of the cable 240 at a portion adjacent to the inlet of the through-hole 401, on the main unit side, of the hinge 40 is covered with a conductive foil 241. The switch board 230 is also placed at a position adjacent to the inlet of the through-hole 401, on the main unit side, of the hinge 40. A grounding pattern 231 extends on a portion of the back surface of the switch board 230 and comes in contact with the conductive foil 241 of the outer surface of the cable 240. The switch board 230 has a positioning hole 232 and two attachment holes 233 and 234. Meanwhile, the housing of the main unit 20 has a positioning boss 269 and two screw bosses 267 and 268. The positioning boss 269 is inserted into the positioning hole 232 and the switch board 230 is screwed as illustrated in FIG. 29 by using the two attachment holes 233 and 234 and female screws 267a and 268a formed respectively on the two bosses 267 and 268.

The conductive foil 241 of the outer surface of the cable 240 extends over both a contact portion with the grounding member 250 and a contact portion with the conductive pattern 231 of the switch board 230. By screwing the switch board 230, the grounding pattern 231 on the back surface of the switch board 230 is grounded to the grounding member 250 through the conductive foil 241 on the outer surface of the cable 240.

In this manner, the switch board 230 is grounded through the outer surface of the cable 240, thereby eliminating extra wirings for grounding. This contributes to a reduction in size and weight of the note PC accordingly.

It is noted that the grounding member 250 is herein provided; however, for example, an inner wall surface of the housing of the main unit 20, which is conductively plated, may be used alternatively. Namely, a separate member from the housing does not have to be used as a member that grounds the conductive pattern 231 on the switch board 230 through the outer surface of the cable 240.

(Plate Structure Under Keyboard)

Figure 31:
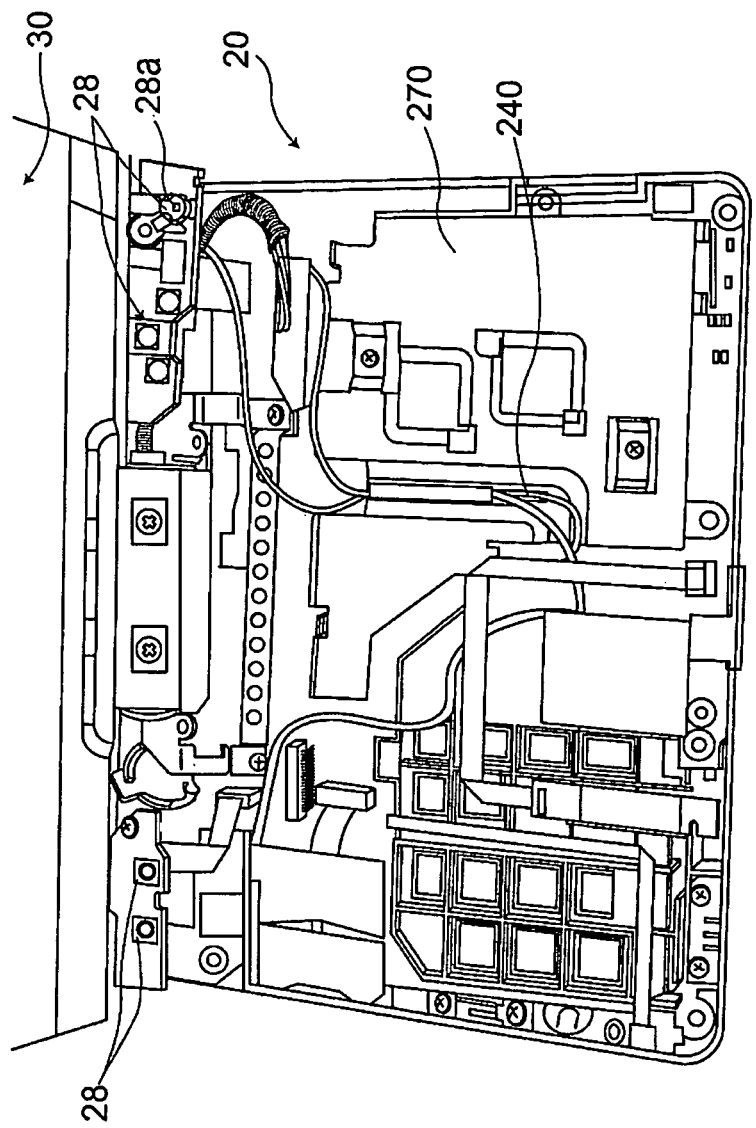
FIG. 31 is a view illustrating the upper surface of the main unit from which the upper cover is detached and a keyboard is further detached.

FIG. 31 is a view illustrating the upper surface of the main unit 20 from which the upper cover 210 (see FIG. 19) is detached and the keyboard 21 is further detached. Here, a plate member 270, which supports the keyboard 21 (for example, see FIG. 19) from the lower side, extends.

Figure 32:
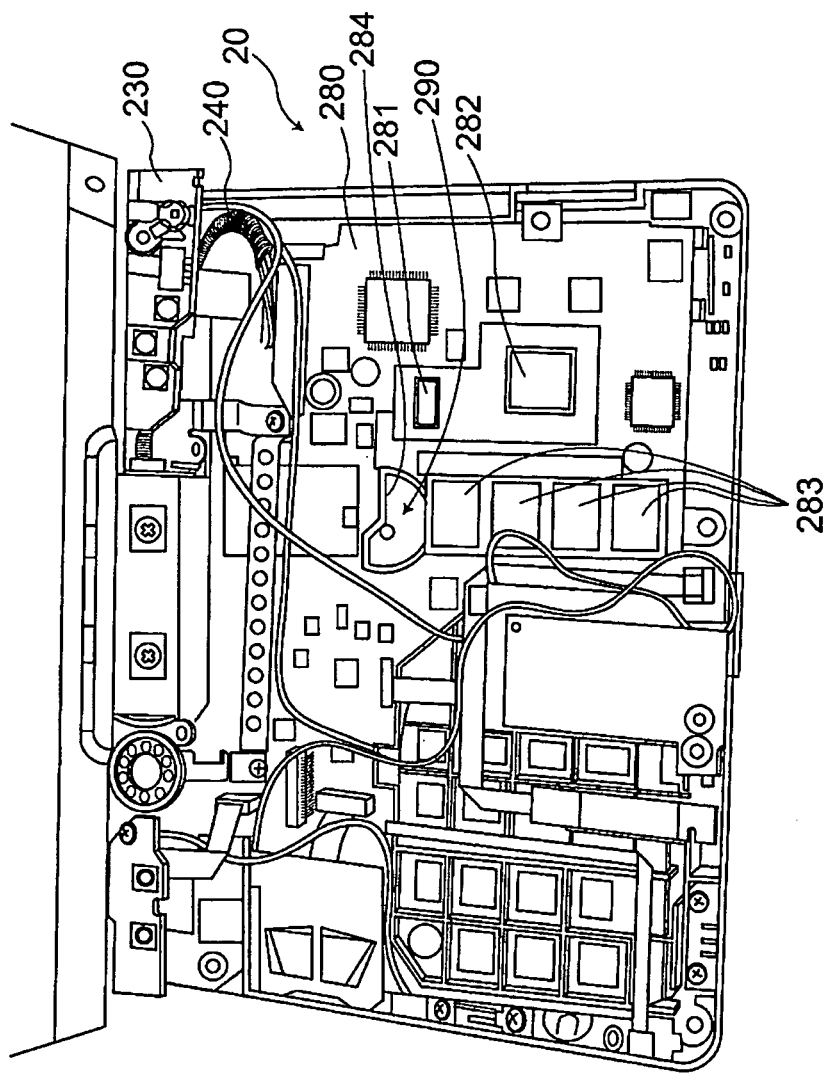
FIG. 32 is a view illustrating the upper surface of the main unit in a state in which the plate member is further detached from the upper surface of the main unit illustrated in FIG. 31.

FIG. 32 is a view illustrating the upper surface of the main unit 20 in a state in which the plate member 270 is further detached from the upper surface of the main unit 20 illustrated in FIG. 31.

Under the plate member 270, the circuit board 280 extends and numerous electronic components are mounted on the circuit board 280 as illustrated in FIG. 32. Among numerous electronic components mounted on the circuit board 280, attention is focused on a CPU 281 and a chip set 282, which are heat-generating electronic components, and four arrayed memory ICs 283, whose heat radiation is needed to be considered to some degree though they do not generate heat as much as the CPU 281 and chip set 282. An opening 284, which serves as an air passage and penetrates front and back surfaces of the circuit board 280, is formed in the circuit board 280 at a portion adjacent to the four memory ICs 283. A fan 290 provided on the back surface of the circuit board 280 is partially exposed through the opening 284.

Figure 33:
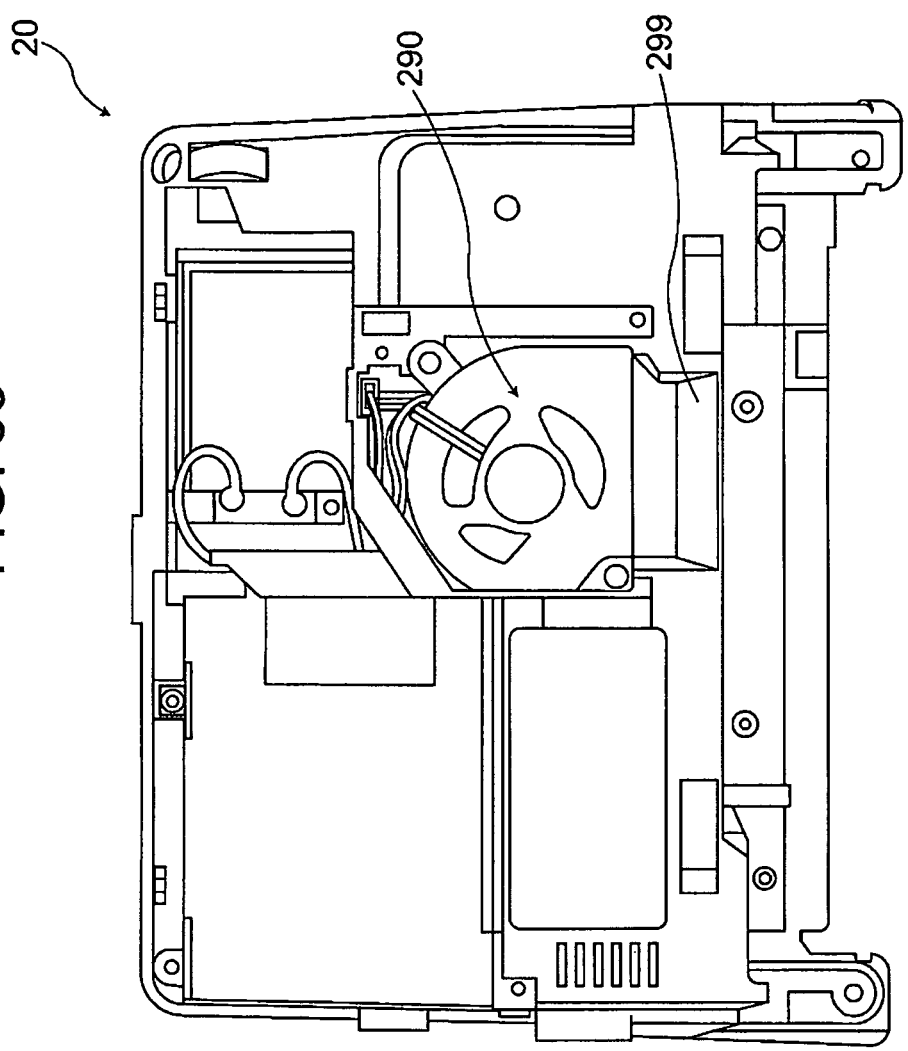
FIG. 33 is a view illustrating the main unit, from which a bottom cover thereof is detached, seen from a bottom side.

FIG. 33 is a view illustrating the main unit 20, from which a bottom cover thereof is detached, seen from a bottom side.

In FIG. 33, the fan 290 partially exposed in FIG. 32 appears. The fan 290 blows air to an air passage 299 The air blown from the fan 290 passes through the air passage 299 and is exhausted outside the main unit 20 from the outlet 249 (see FIG. 4) located at the bottom surface of the main unit 20 (see also FIG. 37 to be described later).

Figure 34:
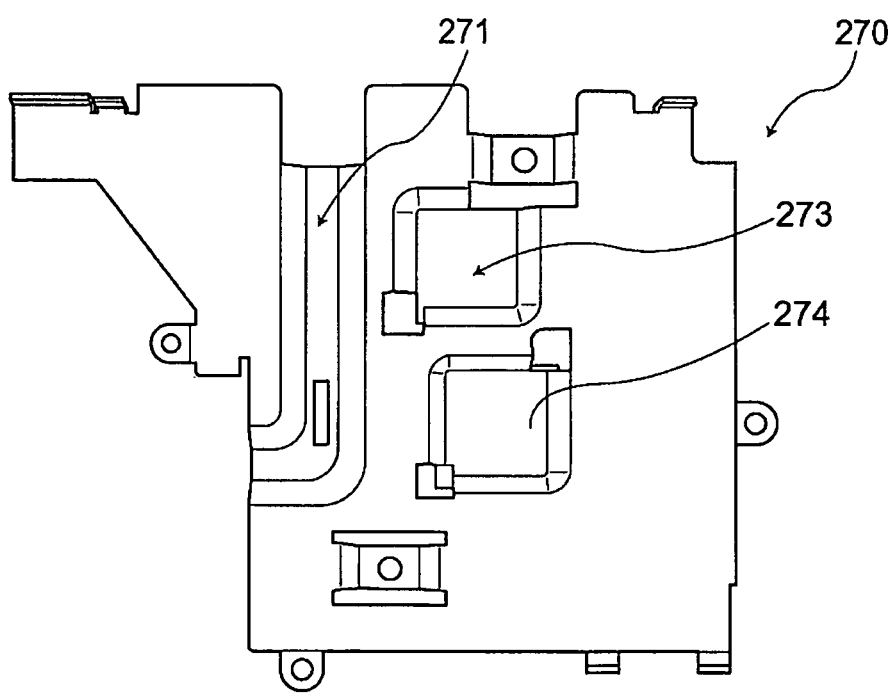
FIG. 34 is a view illustrating only the plate member appeared in FIG. 31.
Figure 35:
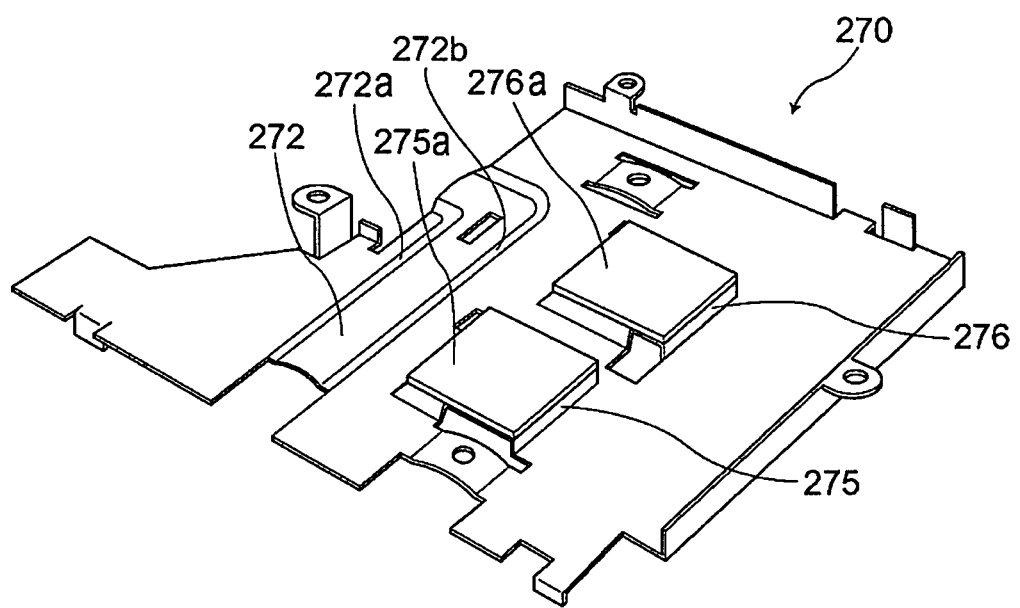
FIG. 35 is a perspective view illustrating a back surface of the plate member facing the circuit board.
Figure 36:
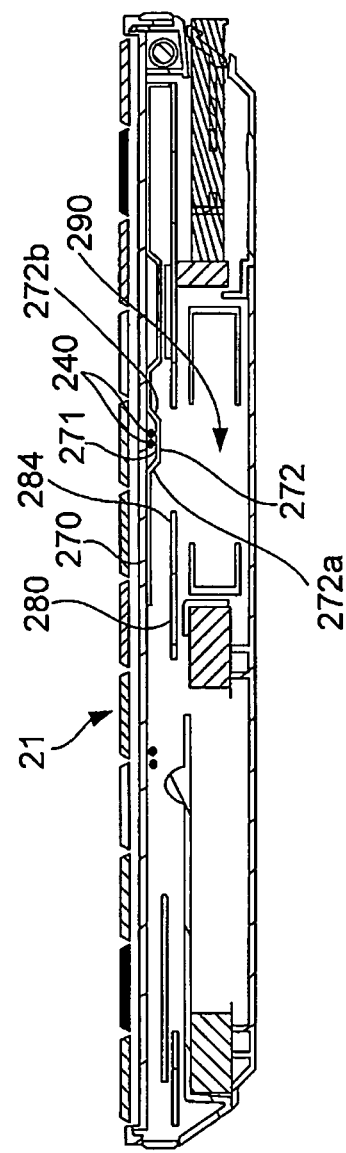
FIG. 36 is a cross-sectional view taken along an arrow Y-Y in FIG. 1.
Figure 37:
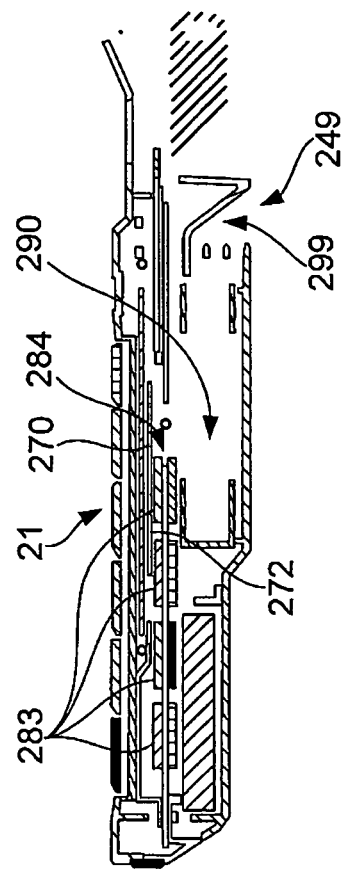
FIG. 37 is a cross-sectional view taken along an arrow Z-Z in FIG. 1.

FIG. 34 is a view illustrating only the plate member 270 appeared in FIG. 31. FIG. 35 is a perspective view illustrating a back surface of the plate member 270 facing the circuit board 280. FIG. 36 is a cross-sectional view taken along an arrow Y-Y in FIG. 1, and FIG. 37 is a cross-sectional view taken along an arrow Z-Z in FIG. 1.

The plate member 270 has a function of supporting the keyboard 21 (for example, see FIG. 19) from the lower side. In addition to this, the plate member 270 has a function as a heat radiation member, a function of forming a cable passage, and a function as an air internal member that guides air on the surface of the circuit board 280 (surface of the circuit board 280 appearing in FIG. 32) to the opening 284.

These functions will be described below.

The plate member 270 has a concave groove 271, which is recessed from a reference surface of the plate member 270, on an upper surface (surface indicated in FIGS. 33 and 34) facing the side opposed to the circuit board 280. The plate member 270 also has a convex line 272, which corresponds to the concave groove 271 on the upper surface, on a lower surface (surface indicated in FIG. 35) facing the circuit board 280. The concave groove 271 is used as a passage for a cable 291 as illustrated in FIGS. 31 and 36. The plate member 270 is electrically grounded and therefore a structure is achieved in which electronic components on the circuit board 280 and the cable 291 are electrically isolated from each other by the plate member 270 to prevent noise from being easily mixed mutually.

Further, the convex line 272 formed on the lower surface of the plate member 270 extends along the four memory ICs 283 as illustrated in FIG. 37. Here, the convex line 272 comes close to the memory ICs 283 being the heat-generating components to serve to absorb heat from the memory ICs 283 into the plate member 270. As illustrated in FIGS. 35 and 36, inclined surfaces 272a and 272b are formed on both sides of the convex line 272. These inclined surfaces 272a and 272b are useful to allow air on the upper surface of the circuit board 280 to flow into the opening 284 smoothly, thus improving efficiency of heat radiation due to smooth air flow.

Moreover, the plate member 270 has recesses 273 and 274 when seen from the upper surface (the surface illustrated in FIG. 34), that is, protrusions 275 and 276 when seen from the lower surface (the surface illustrated in FIG. 35). These protrusions 275 and 276 are provided at positions corresponding to the CPU 281 and chip set 282 being heat-generating electronic components on the circuit board 280 illustrated in FIG. 32. These protrusions 275 and 276 come in close contact with the CPU 281 and chip set 282 with heat transmission pads 275a and 276a formed therebetween, respectively, and serve to transmit heat to the plate member 270 from the CPU 281 and chip set 282.

Heat generated by the heat-generating electronic components such as the CPU 281, chip set 282, four memory ICs 283 and the like is directly transmitted to air therearound. Or, the heat is transmitted to the plate member 270, and the heat is dispersed by the plate member 270 and transmitted to air from the plate member 270. The air thus heated is absorbed by the fan 290 through the opening 284 while being guided by the inclined surfaces 272a and 272b of the convex line 272 of the plate member 271, and is exhausted outside the main unit 20 from the outlet 249 by the fan 290.

In the electronic apparatus disclosed in the present invention, the antenna body having the protruding section as the rotary shaft is housed and the housing and the cover are fastened by the protruding section. Accordingly, there is no need for providing a separate member from the member that fastens the base body and the cover in order to attach the antenna body to the rotary shaft. Thereby, it is possible to provide the housable and exposable antenna body while contributing to a reduction in thickness.

As has been described above, according to the electronic apparatus disclosed in the present invention, there is provided a structure having a housable and exposable antenna while maintaining a reduction in thickness of the housing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An electronic apparatus comprising:
a housing that comprises:
a base body that houses an electronic component, comprising a plate section with at least one corner and a side extending from the one corner, and a side surface section formed on a peripheral edge of the plate section in a standing manner; and
a cover covering at least a peripheral edge section of the base body,
wherein the plate section comprises an antenna housing section that includes one corner section of the plate section and extends along one side from the one corner section, and a protruding section that is formed on the one corner section of the plate section in a standing manner towards the cover and includes a screw in which a female screw hole is formed, the screw hole opening toward a side opposite to the plate section,
wherein the side surface section includes an opening which communicates between the antenna housing section and the outside of the housing; and
an antenna body having a plate piece-like shape with a length to be housed in the antenna housing section, the antenna body including an antenna for radio communications and on one end section, a bearing section with an insertion hole which penetrates front and back surfaces of the antenna body to receive insertion of the protruding section, the antenna body being housed in the antenna housing section with being sandwiched between the plate section and the cover, and protruding from the housing when being rotated with the protruding section as a rotary shaft,
wherein the cover is fastened to the protruding section with the protruding section inserted into the insertion hole by screwing a screw through the cover from a side of a surface opposite to a surface facing the plate section of the cover with the female screw,
wherein the antenna body further includes a locked section on the other end section opposite to the one end section in which the insertion hole is formed,
the electronic apparatus further comprises a locking mechanism that includes:
a slide lever which is formed at a position adjacent to an end section of the side surface section, away from the protruding section of the antenna housing section;
a locking member which is pivotably and rotatably supported on the plate section, is locked with the locked section to hold the antenna body in the antenna housing section, and releases the lock of the locked section by rotating upon reception of an operation of the slide lever; and
an urging member which urges the locking member to a position to be locked with the locked section,
wherein the locking member further includes:
an operation receiving arm which extends towards the slide lever and rotates the locking member upon reception of the operation of the slide lever;
a locking claw which locks the locked section and releases the lock of the locked section when the operation receiving arm rotates the locking member upon reception of the operation of the slide lever; and
a push-out arm which extends along an inner side of the antenna body, opposite to an opening side, and pushes out the antenna body from the antenna housing section when the operation receiving arm rotates the locking member upon reception of the operation of the slide lever, and
wherein the push-out arm and the locking claw are formed as one piece and move together.

2. The electronic apparatus according to claim 1, further comprising a plate member sandwiched between the housing and the antenna body with the protruding section being inserted in the plate member so as to interfere with the bearing section, the plate member being locked with the antenna body so as to hold an attitude of the antenna body at locked attitudes including:
a housed attitude where the antenna body is housed in the antenna housing section;
and a protruding attitude where the antenna body is rotated from the housed attitude by a predetermined angle with the protruding section as the rotary shaft and protrudes from the housing, the plate member releasing the lock upon reception of a force in a rotational direction of the antenna body.

3. The electronic apparatus according to claim 2, wherein the bearing section further includes an engaging concave section on a surface coming in contact with the plate member, and
the plate member further includes an elastic convex section which is fitted into the engaging concave section when the antenna body is in the locked attitudes, and is elastically deformed and detached from the engaging concave section in association with the rotation of the antenna body.

4. The electronic apparatus according to claim 2, wherein the protruding attitude includes a first protruding attitude where the antenna body rotates by 90 degrees from the housed attitude, and
a second protruding attitude where the antenna body further rotates by 90 degrees from the first protruding attitude.

5. The electronic apparatus according to claim 1, further comprising a cable that is electrically connected to the antenna body, wherein the cable is wound around the protruding section in a direction of being rewound when the antenna body is rotated in a direction of protruding from the antenna housing section.

6. The electronic apparatus according to claim 4, wherein the antenna body further includes a first protrusion as a locked section which is formed on the other end section on an inner side, opposite to an opening side, and protrudes in a direction extending along the inner side, and
a second protrusion which is formed on the other end section on the opening side, and protrudes in a direction extending the opening side.

7. The electronic apparatus according to claim 1, wherein the housing has a display panel on its front side, and
the electronic apparatus further comprises a second housing which includes a keyboard mounted thereon, wherein the housing and the second housing are such that the housing is openably and closably coupled to the second housing.

* * * * *